(12) United States Patent
Pegrum et al.

(10) Patent No.: US 8,483,224 B2
(45) Date of Patent: Jul. 9, 2013

(54) HITLESS SWITCHOVER AND BANDWIDTH SHARING IN A COMMUNICATION NETWORK

(75) Inventors: Michael Scott Pegrum, Nepean (CA); Greg A. Wilbur, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/413,171

(22) Filed: Mar. 6, 2012

(65) Prior Publication Data

US 2012/0201123 A1 Aug. 9, 2012

Related U.S. Application Data

(63) Continuation of application No. 10/195,620, filed on Jul. 15, 2002, now Pat. No. 8,144,711.

(51) Int. Cl.
*H04L 12/28* (2006.01)
(52) U.S. Cl.
USPC ............................ 370/394; 370/390; 370/428
(58) Field of Classification Search
USPC .................................. 370/389, 390, 394, 428
See application file for complete search history.

(56) References Cited

U.S. PATENT DOCUMENTS

| | | | |
|---|---|---|---|
| 5,561,661 A | 10/1996 | Edmaier et al. | |
| 5,953,337 A | 9/1999 | Almay | |
| 6,038,230 A | 3/2000 | Ofek | |
| 6,351,454 B1 | 2/2002 | Crocker et al. | |
| 6,512,747 B1 | 1/2003 | Umeuchi et al. | |
| 6,608,813 B1 | 8/2003 | Chiussi et al. | |
| 6,674,741 B1 | 1/2004 | Rasanen | |
| 6,687,752 B1 | 2/2004 | Falco et al. | |
| 6,788,686 B1* | 9/2004 | Khotimsky et al. | 370/394 |
| 7,065,068 B2 | 6/2006 | Ghosh et al. | |
| 7,088,717 B2 | 8/2006 | Reeves et al. | |
| 7,206,309 B2* | 4/2007 | Pegrum et al. | 370/389 |
| 7,277,954 B1 | 10/2007 | Stewart et al. | |
| 7,447,198 B1 | 11/2008 | Banks et al. | |
| 7,761,562 B1 | 7/2010 | Stewart et al. | |
| 7,953,094 B1* | 5/2011 | Greene | 370/394 |
| 2002/0051453 A1 | 5/2002 | Heo et al. | |
| 2002/0075873 A1* | 6/2002 | Lindhorst-Ko et al. | 370/394 |

OTHER PUBLICATIONS

Newton's telecom dictionary, Harry Newton, Feb. 2002, Pub by CMP Books, 18th edition, p. 751.

* cited by examiner

*Primary Examiner* — Christopher Grey
(74) *Attorney, Agent, or Firm* — Guerin & Rodriguez, LLP

(57) ABSTRACT

Described is a node comprising a switch fabric and first and second ingress modules. The first ingress module receives a first stream of packets from a first physical path through the network; forwards a copy of the first stream of packets to an intermodule communication channel; selects packets from the first stream of packets and a copy of a second stream of packets for forwarding to the switch fabric. The second ingress module receives the second stream of packets from a second physical path through the network; forwards the copy of the second stream of packets to the intermodule communication channel; and selects packets from the copy of the first stream of packets and the second stream of packets for forwarding to the switch fabric based on sequence numbers in the packets.

20 Claims, 13 Drawing Sheets

HITLESS SWITCHOVER AND BANDWIDTH SHARING IN A COMMUNICATION NETWORK

RELATED APPLICATIONS

This application is a continuation application claiming the benefit of the filing date of U.S. patent application Ser. No. 10/195,620, filed Jul. 15, 2002, entitled "Hitless Switchover and Bandwidth Sharing in a Communication Network," contents of which are incorporated by reference herein in their entirety.

FIELD OF THE INVENTION

The invention relates generally to communication networks. More particularly, the invention relates to a system and method of protection switching in a communication network in the event of equipment and line failures.

BACKGROUND

Equipment and line failures in a communication network can cause the undesired loss of data. Consequently, industry has produced various mechanisms to mitigate the effects of such failures. One mechanism entails providing a working bandwidth and a protection bandwidth for communications through the network. The protection bandwidth provides an alternative means for delivering communications through the network should the working bandwidth fail. When there is a failure, the network switches over from the working bandwidth to protection bandwidth, referred to as a switchover.

In some instances, the same line (i.e., physical interface, e.g., fiber) carries the working and protection bandwidth, thus a single line cut defeats the protection offered by the protection bandwidth. Even if the working and protection bandwidths are provisioned on separate lines (i.e., a working line and a protection line), typically these lines are physically proximate to each other or traverse the same network equipment. Injury to one line can affect the other line because of their physical proximity, thus impacting both the working and protection lines. Similarly, the failure of network equipment that handles both the working and protection lines can disable both lines.

There are also various techniques for achieving a switchover in the event of a failure. In one technique, the protection line does not carry real traffic until the transmitting end learns of the failure and of the subsequent switchover. In this instance, despite the redundancy, data is lost until the transmitting end diverts real traffic to the protection line.

In another technique, the working and protection lines provide redundancy by simultaneously carrying the same traffic. Here, the receiving end does not need to communicate the failure and switchover to the transmitting end because both lines carry the same information. For this technique, each network switching element between the transmitting end and the receiving end participates in the decision as to which of the working and protection lines is the active line. A switchover from the working line to the protection line can occur at any one of these intermediate points. A disadvantage, however, of this type of protection switching system is that the network switching elements are part of the same service provider network. This dependence on a single service provider exposes both the working and protection lines to a single failure of the service provider.

Consequently, there remains a need for an improved protection switching system that not only can achieve protection across multiple paths, but also across multiple service providers.

SUMMARY

In one aspect, provided is a node for a packet communication network. The node comprises a switch fabric and first and second ingress modules. The first ingress module is operable to receive a first stream of packets from a first physical path through the network; to forward a copy of the first stream of packets to an intermodule communication channel; to receive a copy of a second stream of packets from the second ingress module; and selected to forward packets to the switch fabric, to select packets from the first stream of packets and the copy of the second stream of packets for forwarding as a single packet stream to the switch fabric based on sequence numbers in the packets. The second ingress module is operable to receive the second stream of packets from a second physical path through the network; to forward the copy of the second stream of packets to the intermodule communication channel; to receive the copy of the first stream of packets from the intermodule communication channel; and when selected to forward packets to the switch fabric, to select packets from the copy of the first stream of packets and the second stream of packets for forwarding as a single packet stream to the switch fabric based on sequence numbers in the packets. The first and second ingress modules are operable such that, at any time, only one of the first and second ingress modules is selected to forward packets to the switch fabric.

In another aspect, provided is a method of operating a node for a packet communication network. The method comprising: operating a first ingress module to receive a first stream of packets from a first physical path through the network; to forward a copy of the first stream of packets to an intermodule communication channel; to receive a copy of a second stream of packets from a second ingress module; and when selected to forward packets to the switch fabric, to select packets from the first stream of packets and the copy of the second stream of packets for forwarding as a single packet stream to the switch fabric based on sequence numbers in the packets. The method further comprises operating the second ingress module to receive the second stream of packets from a second physical path through the network; to forward the copy of the second stream of packets to the intermodule communication channel to receive the copy of the first stream of packets from the intermodule communication channel; and when selected to forward packets to the switch fabric, to select packets from the copy of the first stream of packets and the second stream of packets for forwarding as a single packet stream to the switch fabric based on sequence numbers in the packets. The method further comprises operating the first and second ingress modules such that, at any time, only one of the first and second ingress modules is selected to forward packets to the switch fabric.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
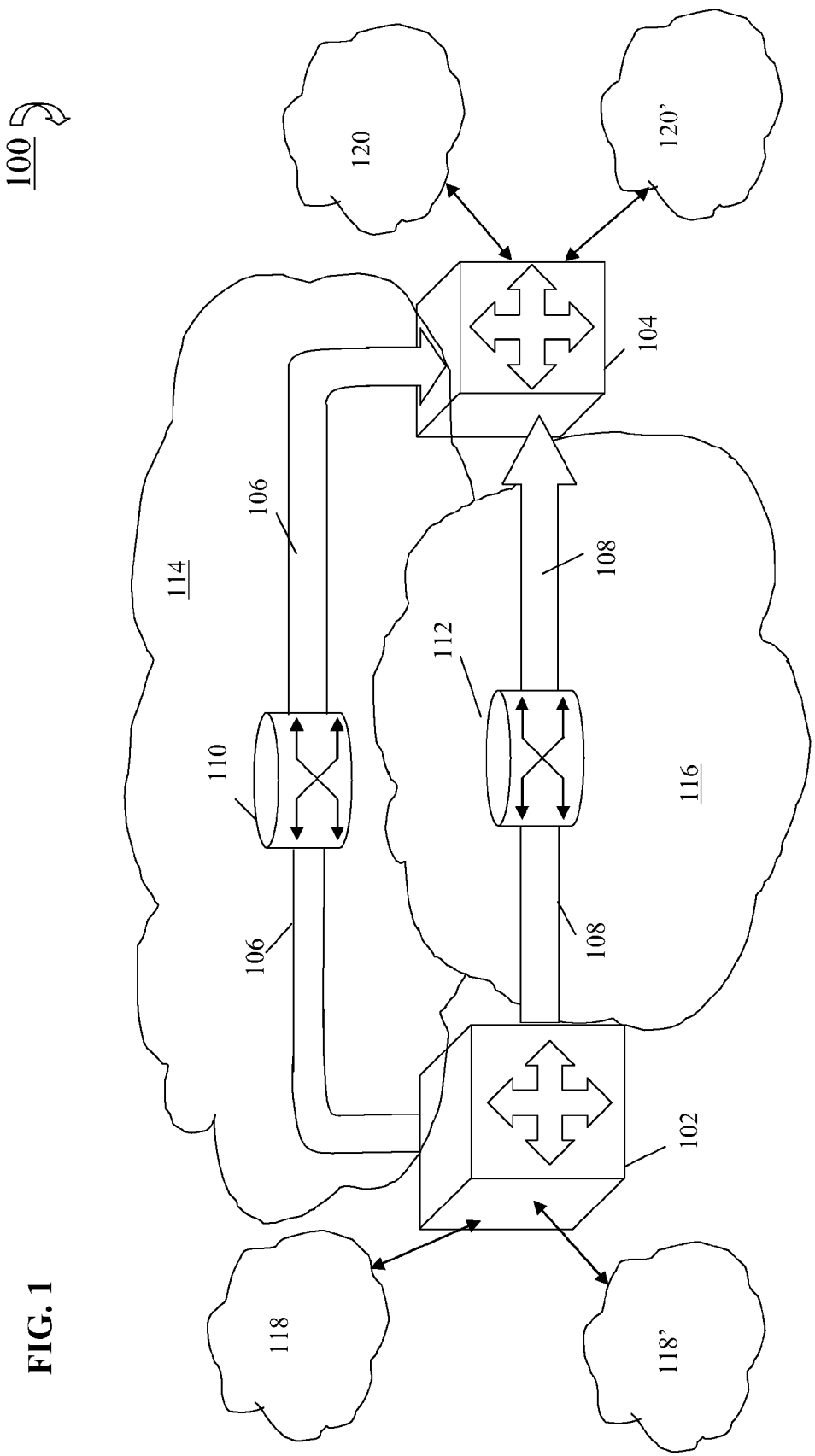
FIG. 1 is a diagram illustrating an embodiment of a network including a source endpoint device and a destination endpoint device, each constructed in accordance with the principles of the invention.

FIG. 1 shows an embodiment of a communication network 100, constructed in accordance with the invention, including a first endpoint device 102 in communication with a second endpoint device 104 over a plurality of paths 106 and 108. Each path 106, 108 traverses the communication network 100 from the first endpoint device 102 to the second endpoint device 104 through a different set of one or more intermediate switching devices. An intermediate switching device 110 is in the path 106 and an intermediate switching device 112 is in path 108. In general, an intermediate switching device is any network switching equipment that is in a path between the first and second endpoint devices 102, 104. Examples of intermediate switching devices include, but are not limited to, IP (Internet Protocol) routers and ATM (Asynchronous Transfer Mode) switches.

Each path 106, 108 is unidirectional from the first endpoint device 102 to the second endpoint device 104 and pre-established among the endpoint devices 102, 104 and the intermediate switching devices 110, 112 before the transfer of user data. With respect to the paths 106, 108, the first endpoint device 102 is referred to as the source endpoint device 102 and the second endpoint device 104 as the destination endpoint device 104. Although only the two paths 106, 108 appear in FIG. 1, it is to be understood that the principles of the invention apply to embodiments having more than two paths.

In addition to handling packet streams that travel over paths 106, 108, each endpoint device 102, 104 can handle other traffic and operate as a single interface that multiplexes among a variety of paths. Also, each endpoint device 102, 104 can operate as both a source endpoint device and as a destination endpoint device for other paths. An endpoint device that is both a source endpoint device and a destination endpoint device has source endpoint device elements and destination endpoint device elements described in more detail below.

In one embodiment, the communication network 100 includes a plurality of sub-networks 114, 116. As shown in FIG. 1, the path 106 passes through the sub-network 114 and the path 108 passes through the sub-network 116. The paths 106, 108 also pass through different intermediate switching equipment. In one embodiment, each sub-network 114, 116 is operated by a different service provider, that is, a first service provider operates the sub-network 114 and a second service provider operates the sub-network 116. Although shown to pass through different service providers, each path 106, 108 can pass through the same sub-network operated by a single service provider without departing from the principles of the invention.

With multiple paths passing through different intermediate switching equipment, a single point of equipment failure typically does not affect the flow of packet traffic on all path(s). By allocating the paths to different service providers, traffic flow and other technical problems experienced by one service provider typically do not affect the service provided by other the service provider(s). Thus, using multiple paths and multiple service providers increases the likelihood that a particular packet stream transmitted by a source user network 118 will successfully arrive at the destination endpoint device 104 and decreases the likelihood of an equipment failure that shuts down all paths.

One or more user networks 118, 118' (generally, user network 118) is in communication with the endpoint device 102 and one or more user networks 120, 120' (generally, user network 120) are in communication with the endpoint device 104 to exchange sets of packets (also referred to as packet streams). In one embodiment, the source user network 118 and destination user network 120 are part of a first virtual private network (VPN) and the source user network 118' and destination user network 120' are part of a second virtual private network (VPN).

In one embodiment, the communication network 100 is a multiprotocol label switching (MPLS) network, the endpoint devices 102, 104 function as label edge routers (LER), the intermediate switching devices 110, 112 function as label switch routers (LSR), and each path 106, 108 is a label switch path (LSP).

In an MPLS network, a label edge router is located at the beginning or end of a label-switching tunnel. A label edge router at the beginning of a tunnel applies labels to new packets entering the tunnel. A label edge router at the end of a tunnel removes labels from packets exiting the tunnel. Intermediate switching devices remove and apply labels to packets passing through such devices along an LSP. Each LSP is a predetermined route by which a packet stream bound to a particular class of traffic or forward equivalence class (FEC) traverses through the MPLS network 100 from the source LER to the destination LER.

In operation, the present invention provides protection switching for communications between the source and destination user networks 118, 120. This switching protection involves the participation of the endpoint devices only in the performance of a switchover. The invention in one embodiment also provides a greater degree of protection by implementing separate communication paths through separate networks managed by different service providers for conveying messages between the endpoint devices.

More specifically, the source endpoint device 102 receives a set of packets from the one of the source user networks 118, 118'. From this set of packets, the source endpoint device 102 generates a plurality of packet streams and forwards each packet stream over a different one of the paths 106, 108 to the destination endpoint device 104. As described in more detail below, the source endpoint device 102 adds an identifier (for example, a sequence number) to each packet before sending that packet (or a copy of that packet) over a path to the destination endpoint device 104. Generally, the plurality of packets streams traversing the paths 106, 108 are not bit or byte synchronized with respect to each other; that is, although the packet streams can be identical (i.e., have the same labels, sequence numbers, and user data content), there is no synchronization in time between the bits and bytes of the packet streams when the streams leave the source endpoint device 102 or arrive at the destination endpoint device 104. An advantage achieved by this arbitrary unsynchronized transmission and receipt of packet streams is that the paths 106, 108 do not need to be similarly engineered (e.g., similar equipment, number of hops) in order to maintain any synchronization through the network 100. For example, the source endpoint device 102 can select paths 106, 108 based on most favorable latency without regard to having to find paths that have similar latency behavior.

In an embodiment in which the communication network 100 is a MPLS network, the source endpoint device 102, operating as a label edge router, also adds (e.g., pushes) at least one label onto each packet in the set of packets. The intermediate switching devices 110, 112, operating as label switch routers, swap labels and forward the packets to the next hop in the respective path 106, 108. The swapping of labels and forwarding of packets continues until the packets in the packet stream arrive at the destination endpoint device 104, which operates as a label edge router by removing the labels and marking the packets for delivery to the destination user network 120.

In one embodiment, each packet stream in the plurality of packet streams provided by the source endpoint devices 102 is substantially identical. Each path 106, 108 conveys one copy of the original set of packets received from the source user network 118. In effect, redundant copies of each packet in the original set of packets (with an added sequence number) travel from the source endpoint device 102 to the destination endpoint device 104. For example, consider that the original set of packets includes six packets. The source endpoint device 102 adds sequence numbers 1, 2, 3, 4, 5 and 6 to these six packets in a sequential order. The source endpoint device 102 then provides a plurality of identical packet streams, each packet stream having a copy of the same six packets numbered 1, 2, 3, 4, 5, and 6 in the same sequential order.

In another embodiment, the plurality of packet streams provided by the source endpoint device 102 are different from each other. The source endpoint device 102 distributes the packets in the original set of packets received from the source user network 118 between the paths 106, 108 so that each path 106, 108 carries a different subset of the original set of packets. The source endpoint device 102 determines the particular path taken by each packet based upon the capabilities of each path 106, 108, for example, the transmission bandwidth. Collectively, the paths 106, 108 operate to carry the original set of packets from the source endpoint device 102 to the destination endpoint device 104.

Consider again the original packet stream from the source user network 118 described above having the six packets. From the original packet stream, the source endpoint device 102 produces a plurality of different packet streams based on the bandwidth capabilities of the paths 106, 108. Each packet stream has a different subset of the original set of packets.

If, for example, the paths have equal bandwidth, the source endpoint device 102 divides the original packet stream evenly between the two paths; e.g., one packet stream includes packets numbered 1, 2, and 3 and a second packet stream includes packets numbered 4, 5, and 6.

If the path 106 has twice the bandwidth as the path 108, the source endpoint device 102 provides twice as many packets over path 106 than over path 108; e.g., the packet stream over path 106 includes packets numbered 1, 2, 4 and 5, and the second packet stream over path 108 includes packets numbered 3 and 6.

The destination endpoint device 104 receives the plurality of packet streams over the different paths 106, 108 and selects individual packets from one or the other or both of the packet streams to produce a single packet stream for forwarding to the appropriate destination user network 120. The identifiers added by the source endpoint device 102 to each packet in each packet stream facilitate the selection by the destination endpoint device 104 of which packets to forward to the destination user network 120. The ability of the destination endpoint device 104 to select a packet that has arrived on either path 106, 108, whether or not the network has experienced a failure, illustrates that the paths operate more as peers, rather than as a working path and a protection path.

It is the endpoint devices 102, 104 primarily that achieve the protection switching of the present invention, the source endpoint device 102 by adding sequence numbers to the packets and transmitting multiple packet streams over multiple paths, and the destination endpoint device 104 by selecting packets from the arriving packet streams based on their sequence numbers.

Thus, the protection switching occurs at the source and destination endpoint devices 102, 104, and not on a hop-by-hop basis throughout the network 100. This facilitates the deployment of the present invention into existing networks, because changes to legacy intermediate switching devices are not needed to achieve the protection switching of the present invention. Also, the role of delivering quality of service falls chiefly to the endpoint devices 102, 104 and on a lesser degree to the intermediate switching devices or other such networking equipment in the communication network 100.

In the event one of the paths 106, 108 fails, the destination endpoint device 104 still receives the other packet stream from the other path. For embodiments in which the paths 106, 108 carry identical packet streams, the redundancy of the other packet stream enables the destination endpoint device 104 to receive a copy of every packet in the original packet stream. If prior to the failure, the destination endpoint device 104 had been selecting packets from the packet stream traversing the failed path, the destination endpoint device 104 now switches over to the packets arriving from the other packet stream on the other functioning path. The "switchover" is "hitless" in that the switchover itself does not cause the loss of any packets.

For embodiments in which the paths 106, 108 carry different packet streams, the destination endpoint device 104 notifies the source endpoint device 102 of the failed path. In response, the source endpoint device 102 redistributes the set of packets on the remaining functioning paths. In this case, the switchover is not hitless because packets are lost until the source endpoint device 102 becomes aware of the failure and of the need to readjust the packet streams.

Figure 2:
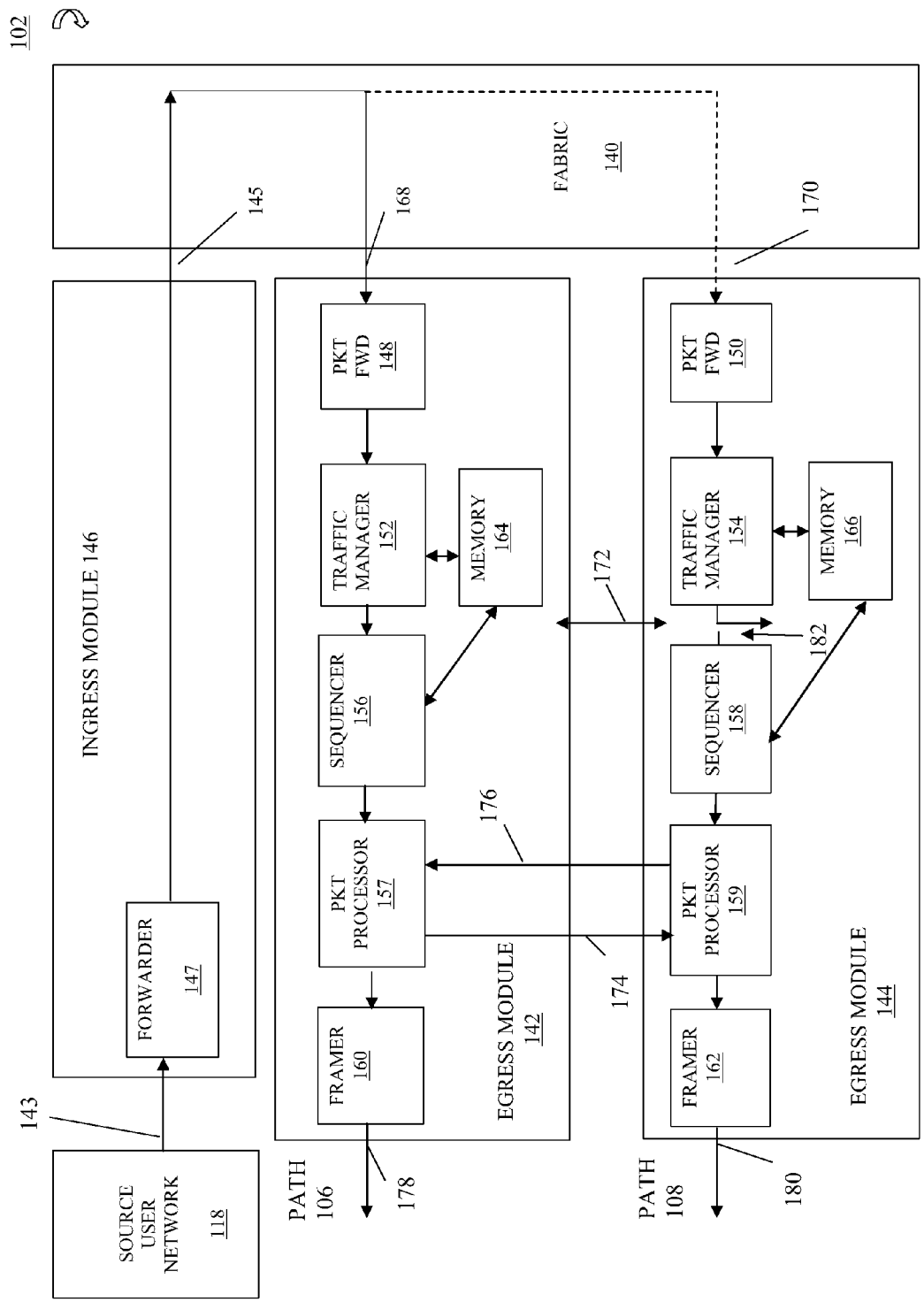
FIG. 2 is a block diagram illustrating an embodiment of the source endpoint device of FIG. 1.

FIG. 2 shows an embodiment of the source endpoint device 102 of FIG. 1 constructed in accordance with the principles of the invention. The source endpoint device 102 includes a fabric 140, a plurality of egress modules 142, 144, and an ingress module 146. The ingress module 146 includes a packet forwarder 147 that is in communication with the source user network 118 over ingress line 143 and with the fabric 140 over ingress line 145. The packet forwarder 147 receives an incoming set of packets from the source user network 118 and determines to which of the egress modules 142, 144 to send the set of packets. The fabric provides a physical interconnection architecture that redirects packets from any incoming port to any outgoing port.

The egress module 142 includes a packet forwarder (PKT FWD) 148, a traffic manager 152, a sequencer 156, a packet processor 157, a framer 160, and memory 164. The egress module 142 is in communication with the fabric 140 over line 168 to receive a packet stream and with a line 178 (e.g., optical fiber), which encompasses the path 106.

The egress module 144 includes a packet forwarder (PKT FWD) 150, a traffic manager 154, a sequencer 158, a packet processor 159, a framer 162, and memory 166. The egress module 144 is in communication with a line 180, which encompasses the path 108 and, in one embodiment, with the fabric 140 over a line 170, shown in FIG. 2 by a dashed line. The egress modules 142, 144 are in communication with each other by a protection switch control signal line 172 and by packet transfer lines 174, 176.

In one embodiment, the ingress module 146, and each egress module 142, 144 are implemented on separate line cards in the source endpoint device 102. Protection switch control line 172 and packet transfer lines 174, 176 appear as backplane traces in the source endpoint device 102. Typically, for such an embodiment, the egress module line cards 142, 144 are located adjacent to each other in the source endpoint device 102 so as to reduce the length of the backplane traces. In another embodiment, the egress modules 142, 144 are implemented on the same line card in the source endpoint device 102. This embodiment has no such backplane traces.

Each packet forwarder 148, 150 includes forwarding and routing tables for use in determining which packets to forward to traffic manager 152, 154, and which packets to ignore. Under normal operation, the packet forwarder 148 of the egress module 148 is in communication with the fabric 140 to receive a packet stream. The packet forwarder 150 of the egress module 144 is not in communication with the fabric 140 under normal operation, but can become connected to the fabric over line 170 in the event of a failure of the egress module 142, described in more detail below.

Each traffic manager 152, 154 is in communication with the packet forwarder 148, 150, respectively, and with memory 164, 166, respectively. The memory 164, 166 provides queuing capabilities used by the respective traffic manager 152, 154, for example, in controlling traffic and congestion. Each traffic manager, when handling a packet stream, controls the traffic and traffic congestion according a predefined set of procedures. Traffic control refers to the set of operations taken by a traffic manager to avoid congestion conditions in the communication network 100. Congestion control refers to the set of operations performed by a traffic manager to minimize the behavior and duration of congestion when congestion occurs.

The sequencer 156 of the egress module 142 is in communication with the traffic manager 152 to receive the packet stream and with the packet processor 157, and the sequencer 158 of the egress module 144 is in communication with the packet processor 159. Under normal operation, there is no communication between the sequencer 158 and the traffic manager 154 (illustrated in FIG. 2 by an open connection 182). The packet processor 157 of the egress module 142 is in communication the packet processor 159 of the egress module 144 by packet transfer lines 174 and 176.

Each framer 160, 162 is in communication with the respective packet processor 157, 159 to receive a packet stream for framing and forwarding over lines 178, 180, respectively. The framer 160 is in communication with the line 178; the framer 162 is in communication with the line 180. Each framer 160, 162 is synchronized to its respective line 178, 180 or operates according to a system clock with a rated tolerance (e.g., 20 ppm (parts per million)).

The particular implementation of each framer 160, 162 depends upon the physical characteristics of the line with which that framer 160, 162 interfaces. Generally, the framers 160, 162 are of the same type, for example, each framer 160, 162 interfaces the same type of line, such as an optical line (e.g., OC192) or an electrical line (e.g., DS3).

Figure 3A:
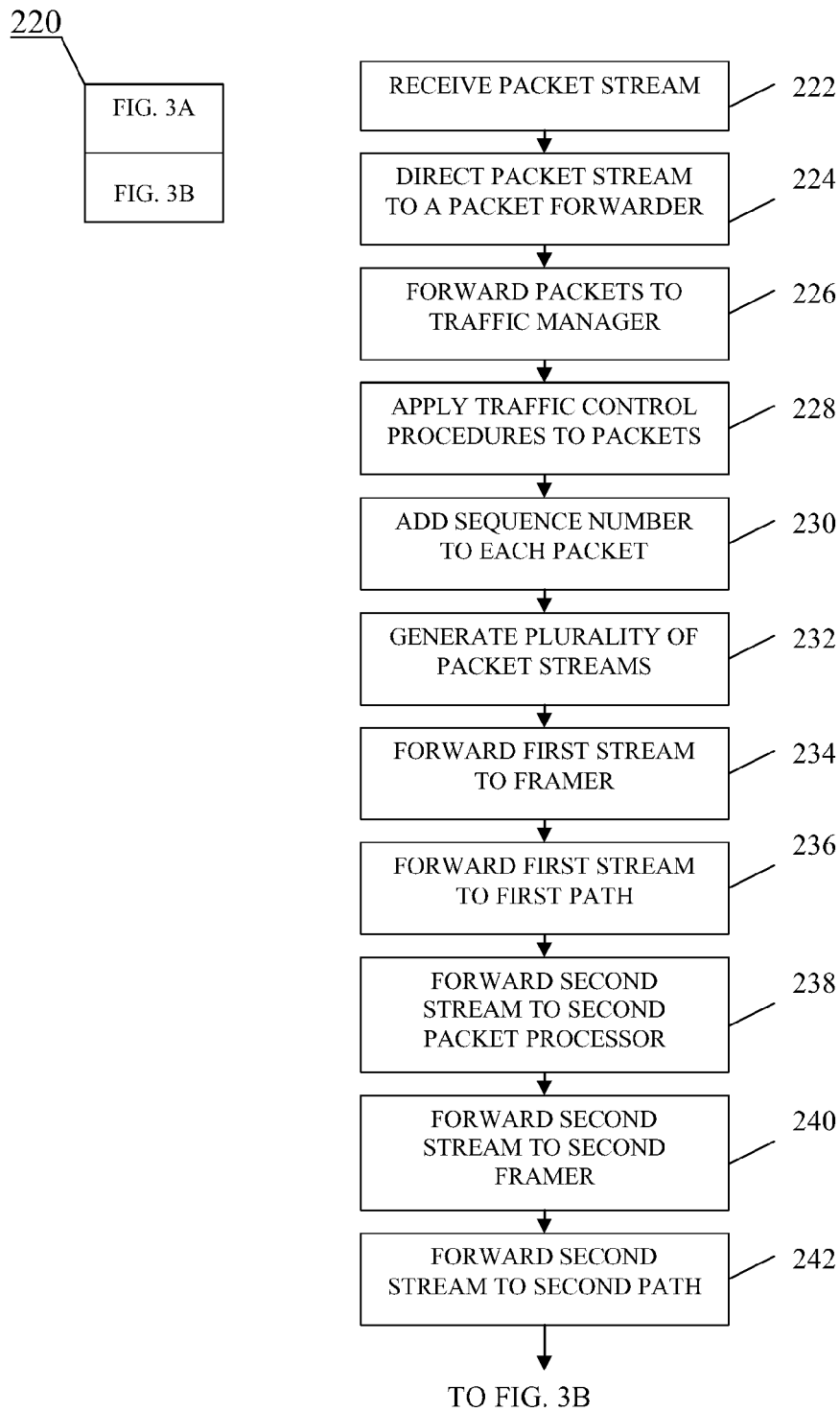
FIG. 3A, FIG. 3B, and FIG. 3C are flow diagrams illustrating an embodiment of a process by which the source endpoint device provides a plurality of packet streams over a plurality of paths through the communication network.

FIG. 3A shows an embodiment of a process 220 used by the source endpoint device 102 to provide a plurality of packet streams from a set of packets received from a source user network 118 for transmission through the communications network 100 over the plurality of paths 106, 108. In the description of the process 220, references are made to elements of the source endpoint device of FIG. 2.

In step 222, a set of packets (i.e., an incoming packet stream) arrives at the fabric 140 from the source user network 118. The fabric 140 directs (step 224) the incoming packet stream to the packet forwarder 148 of the egress module 142, and the packet forwarder 148 forwards (step 226) the incoming packet stream to the traffic manager 152, upon which packet stream the traffic manager 152 applies (step 228) traffic and congestion control procedures. In the application of such control procedures, the traffic manager 152 may discard one or more packets from the incoming packet stream. The traffic manager 152 forwards the controlled packet stream to the sequencer 156. Note that in this embodiment, the fabric 140 does not forward the incoming packet stream to the packet forwarder 150 of the egress module 144 under normal operation.

The sequencer 156 adds (step 230) a sequence number to each packet in the packet stream. In other embodiments, the packet forwarder 148 or the traffic manager 152, rather than the sequencer 156, adds the sequence number to each packet. In such embodiments, the sequencer 156 is bypassed or removed from the source endpoint device 102. The sequence numbers increase incrementally from one packet to the next packet in the packet stream, according to the order in which the sequencer 156 receives the packets from the traffic manager 152. Other numbering schemes are possible without departing from the principles of the invention. The sequencer 156 forwards the packets with the sequence numbers to the packet processor 157.

Figure 4A:
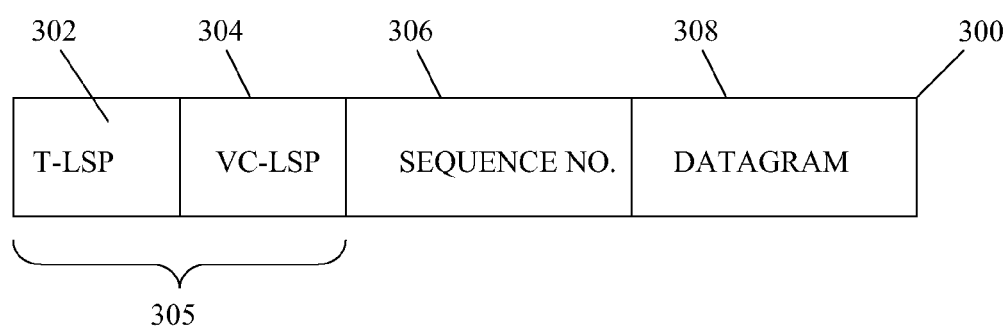
FIG. 4A and FIG. 4B are diagrams of embodiments of packet formats produced by a packet generator of the source endpoint device of FIG. 2.
Figure 4B:
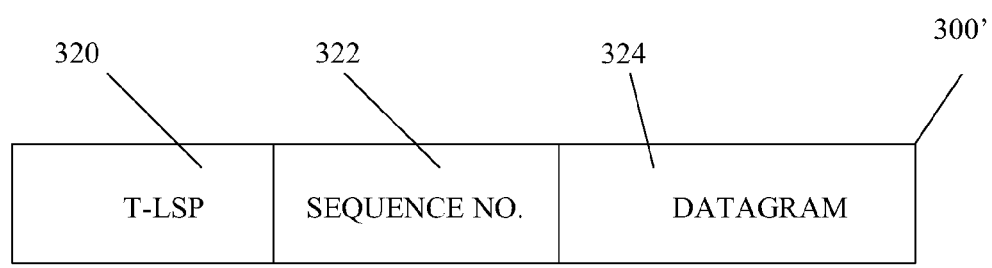

In a MPLS network, the sequencer 156 also pushes one or more labels onto each packet. Examples of packet formats for packets sequenced and labeled by the sequencer 156 are shown in FIG. 4A and FIG. 4B described below.

From these numbered packets, the packet processor 157 provides (step 232) a plurality of packet streams. In one embodiment, the packet processor/sequencer 156 replicates each packet received from the sequencer 156 so that each packet stream in the plurality of packet streams is identical. After replication, there is a one-to-one correspondence between packets in each copy of the packet stream; that is, corresponding packets have the same sequence number and data content. For example, a packet with a sequence number of 1 in a first copy of the packet stream has the same data content as the packet having sequence number 1 in a second copy of the packet stream.

In another embodiment, referred to as bandwidth sharing, the packet processor 157 produces a plurality of packet streams from the packets received from the sequencer 156 such that each packet stream has a different subset of those packets. For example, consider that the packets received from the sequencer 156 include packets with sequence numbers 1 through 7. One exemplary arrangement is for the packet processor 157 to place packets numbered 1, 3, 4 and 6 in a first packet stream and packets 2, 5, and 7 in a second packet stream. The packet processor 157 determines which packets to place in which packet streams based on the bandwidth capabilities of the paths 106, 108. If, for example, the path 106 has twice the bandwidth of path 108, the packet processor 157 can direct twice as many packets to path 106 than to path 108.

When the packet processor 157 is producing a plurality of identical packet streams, the operation of the packet processor 157 is limited to the speed of the slower framer 160, 162.

The packet processor 157 forwards (step 234) a first one of the plurality of packet streams to the framer 160 of the egress module 142, which adapts the packets of the first packet stream for transmission over the physical line 178. The framer 160 then transmits (step 236) the first packet stream over the line 178 on path 106. Using the previous bandwidth-sharing example described above, packets numbered 1, 3, 4 and 6 pass to path 106.

The packet processor 157 also forwards (step 238) a second one of the plurality of packet streams to the packet processor 159 of the egress module 144 over line 174. From the packet processor 159, the second packet stream passes (step 240) to the framer 162, which prepares and transmits (step 242) the packets of the second packet stream for transmission over the physical line 180 on path 108. Again using the previous bandwidth-sharing example described above, packets numbered 2, 6 and 7 pass to path 108. The transmission of the first packet stream over the path 106 generally is not synchronized with the transmission of the second packet stream over the path 108.

Figure 3B:
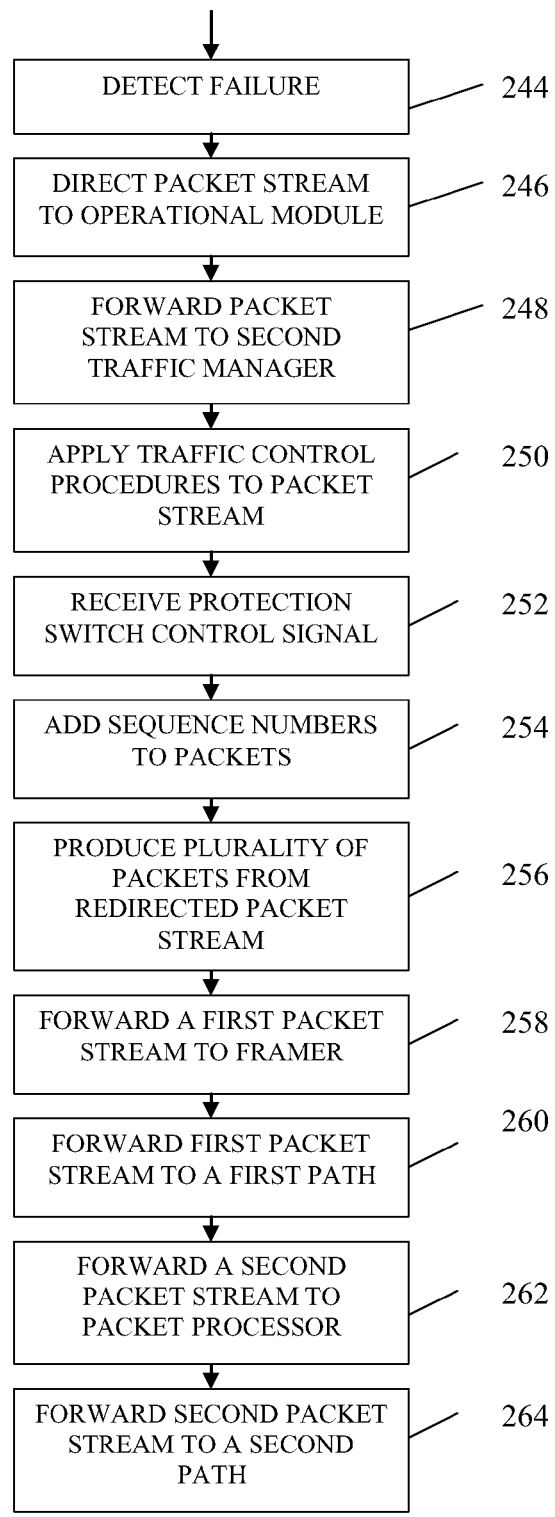

Referring to FIG. 3B, in the event of an equipment failure, e.g., the egress module 142 fails, the failure is detected (step 244) and the incoming packet stream redirected (step 246) to the functioning (i.e., non-failing) egress module 144 over line 170, shown in phantom in FIG. 2. In one embodiment, each line card in the source endpoint device 102 has a broadcast "card up" line on the backplane. Thus, when one line card fails all other cards can sense a card failure simultaneously. In another embodiment, the fabric 140 detects a card failure.

The packet forwarder 150 receives the incoming packet stream from the fabric 140 and forwards (step 248) the packet stream to the traffic manager 154. The traffic manager 154 then controls (step 250) the traffic by applying traffic and congestion control procedures to the packet stream.

The functioning egress module 144 receives (step 252) a signal over the protection switch control line 172 that causes the open connection 182 to close, thus connecting the traffic manager 154 to the sequencer 158. The traffic-controlled packet stream passes from the traffic manager 154 to the sequencer 158. The sequencer 158 adds (step 254) a sequence number to each packet in this packet stream and forwards the numbered packets to the packet processor 159. In other embodiments, the packet forwarder 150 or the traffic manager 154, rather than the sequencer 158, adds the sequence number to each packet, in which instances, the sequencer 158 is bypassed or removed from the egress module 144. In a MPLS network, the sequencer 158 also pushes one or more labels onto each packet.

The packet processor 159 then produces (step 256) a plurality of packet streams from the redirected packet stream. As described above, in one embodiment the packet processor 159 replicates each packet in the redirected packet stream to produce a plurality of identical packet streams and in another embodiment the packet processor 159 apportions the redirected packet stream into a plurality of packet streams to produce different packet streams.

The packet processor 159 forwards (step 258) one of the packet streams to the framer 162 of the egress module 144, which adapts the packets for transmission over the line 180 on path 108. The framer 162 then transmits (step 260) the packet stream to the line 180. Thus, despite the equipment failure of egress module 144, the source endpoint device 102 at a minimum transmits at least one packet stream, here over the path 108. In accomplishing the switchover to the egress module 144, some packets may be lost, in particular, those packets already sent to but not transmitted from the failed egress module 142 at the time of failure.

The packet processor 159 sends (step 262) another of the plurality of packet streams to the packet processor 157 of the failed egress module 142 over the packet transfer line 176. In some instances, the failure of the egress module 142 may be confined to less than the entire module 142, for example, to just the traffic manager 152 or to the packet forwarder 148. If sufficiently operational, the packet processor 157 of the failed egress module 142 receives and sends (step 264) this packet stream to the framer 160, and the framer 160 to the line 178 for transmission on path 106. In such a case, source endpoint device 102 continues to provide a plurality of packet streams to the destination endpoint device 104 over the paths 106, 108, despite the equipment failure.

In the event of a line or a path failure, for example, to line 178 or to path 106, the egress module 142 detects the failure. When the source endpoint device 102 is transmitting redundant packet streams, the packet processor 157 of the egress module 142 continues to replicate the packet stream and forward the replicate to the egress module 144 for subsequent forwarding over path 108. In this instance, the line or path failure does not cause the loss of any data (i.e., hitless). For bandwidth sharing, the egress module 142 finds an alternative path or paths among which to redistribute the packets that would have traversed the failed line or path.

Figure 3C:
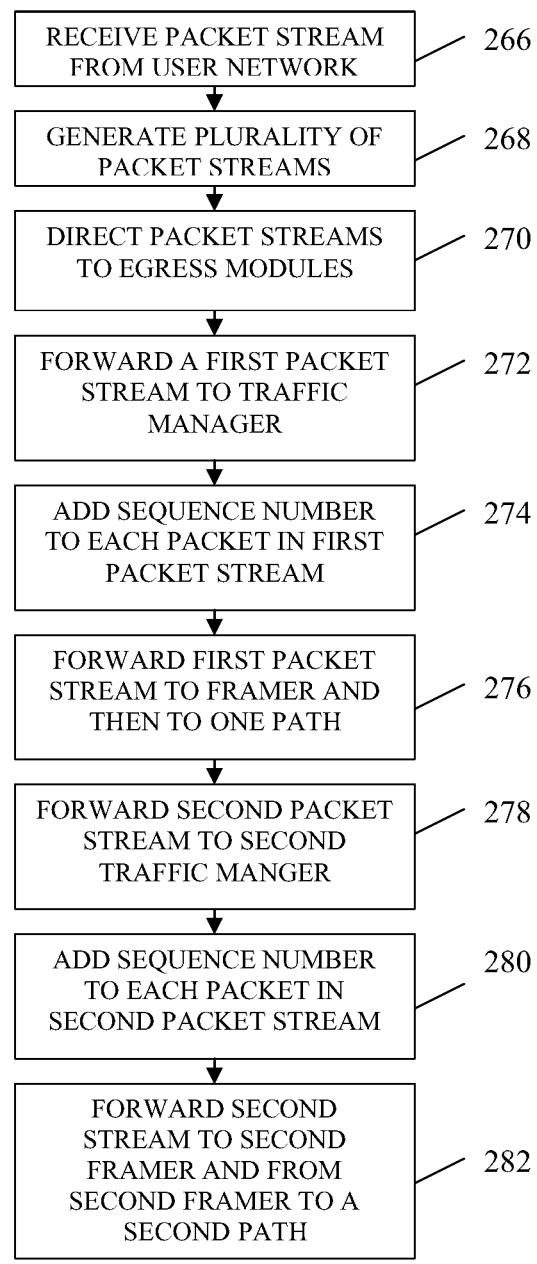

FIG. 3C shows another embodiment of a process 220' used by the source endpoint device 102 to provide a plurality of packet streams from packets received from a source user network 118 for transmission through the communications network 100 over the plurality of paths 106, 108. The endpoint device 102 receives (step 266) a packet stream from the user network 118 and generates (step 268) a plurality of packet streams therefrom. One packet stream passes (step 270) to one egress module 142, and another packet stream to the other egress module 144. Within the first egress module 142, the first packet stream is forwarded (step 272) to the traffic manager 152. A sequence number is added (step 274) to each packet in the first packet stream. The first packet stream passes (step 276) to the framer 160, and from there to one path 106. Within the second egress module 144, the second packet stream is forwarded (step 278) to the traffic manager 154. A sequence number is added (step 280) to each packet in the second packet stream. The second packet stream passes (step 282) to the framer 162, and from there to the second path 108.

FIG. 4A shows an embodiment of a packet format 300 used in applications that employ virtual circuits (VC). The packet format 300 includes a transport label switch path (T-LSP) field 302 and a virtual circuit label switch path (VC-LSP) field 304. The T-LSP field 302 stores a transport (or tunnel) label, and the VC-LSP field 304 holds a VC label. The transport label and VC label form a label stack 305. The VC label is at the bottom of the label stack 305, and the transport label, if present, is directly above the VC label. A particular T-LSP can encompass a number of virtual circuits (VC). The transport label provides an indicator of the destination endpoint device 104. Intermediate switching devices (i.e., label switching routers) use the transport label to carry the packet across the sub-network of a service provider.

Each VC label is unique from other VCs within the same T-LSP and identifies the logical interface (i.e., connection) to the destination user network 120. The endpoint devices 102, 104 signal and maintain each VC between the endpoint devices using a label distribution protocol such as Label Distribution Protocol (LDP) or through static mappings manually configured on each endpoint device 102, 104. In one embodiment, the destination endpoint device 104 removes the transport label and uses the VC label to determine the proper handling of the packet.

The packet format 300 also includes a sequence number field 306 and a datagram field 308. The source endpoint device 102 assigns the sequence number 306 as described above, and the datagram field 308 holds the packet data provided by the user application. In one embodiment, the transport and VC labels and sequence numbers are inserted into the packet between the OSI (Open Systems Interconnect) layer 2 and OSI layer 3.

For embodiments that transmit substantially identical packet streams over the paths 106, 108, a packet in the packet stream traversing path 106 has the same VC-LSP label, sequence number and datagram contents as the corresponding packet in the packet stream traversing path 108. Depending upon the particular design of the network 100, the T-LSP labels of such corresponding packets can be but are not necessarily different.

The source endpoint device 102 adds sequence numbers to the packets sequentially and in order across a VC label, but not within a transport label. For example, one packet stream over path 106 has a T-label #1, a VC label #2, and packets with sequence numbers 1, 2, 3, 4, and 5, and the other packet stream over path 108 has a T-label #3, a VC label #2, and packets with sequence numbers 1, 2, 3, 4, and 5.

As another example, consider two VCs multiplexed on the same T-LSP arriving at the destination endpoint device 104. Each VC has sequencing independent of the sequencing in other VCs. Thus, the sequencing in one VC can have common sequence numbers as another VC. Consider. for example, a packet stream on path 106 with a T-label #1, VC label #2, and packets with sequence numbers 1, 2, 3, 4, 5, and a packet stream on path 108 with a T-label #1, VC label #3, and packets with sequence numbers 3, 4, 5, 6, and 7. Sequencing is relevant only within a particular VC, and not between VCs.

FIG. 4B shows another embodiment of a packet format 300' used in applications that do not have virtual circuits, e.g., IP forwarding. The packet format includes a T-LSP field 320, a sequence number field 322, and a datagram field 324. In this embodiment, the transport label has the characteristics of the previously described VC label for indicating to the destination endpoint device 104 how to handle the packet.

Figure 5:
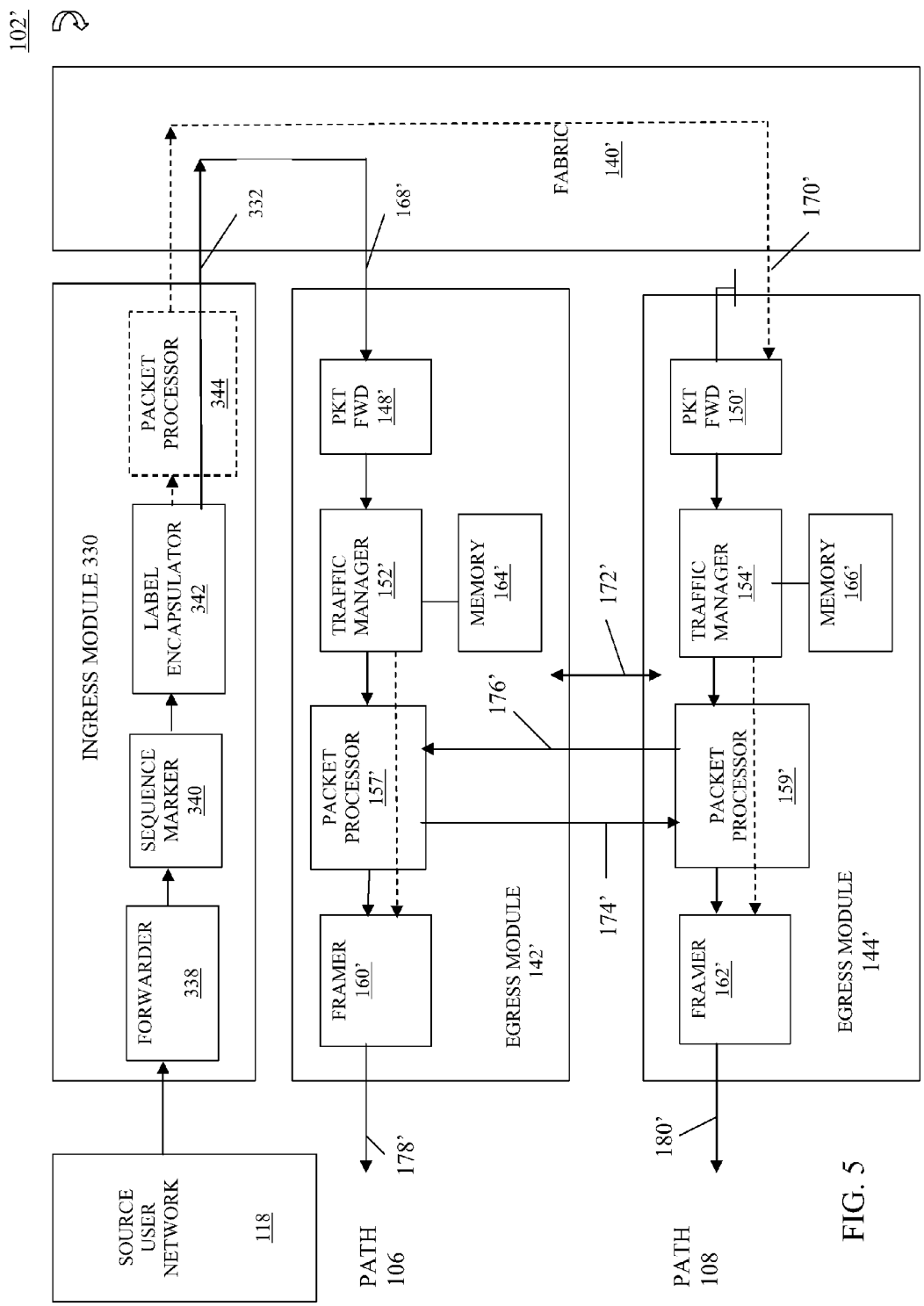
FIG. 5 is a block diagram illustrating other embodiments of the source endpoint device of FIG. 1.

FIG. 5 shows embodiments of a source endpoint device 102' constructed in accordance with the principles of the invention. The source endpoint device 102' includes a fabric 140' and a plurality of egress modules 142', 144', and an ingress module 330. In this embodiment, the fabric 140' is in communication with the egress module 142' over line 168' and with the ingress module 330 over ingress line 332.

The egress module 142' includes a packet forwarder (PKT FWD) 148', a traffic manager 152', a packet processor 157', a framer 160', and memory 164'. The egress module 142' is in communication with the fabric 140' over line 168' to receive a packet stream and with the line 178' which encompasses the path 106. The egress module 144' includes a packet forwarder (PKT FWD) 150', a traffic manager 154', a packet processor 159', a framer 162', and memory 166'. The egress module 144' is in communication with the line 180', which encompasses path 108. The egress modules 142', 144' are in communication with each other by a protection switch control signal line 172' and by packet transfer lines 174', 176'.

The ingress module 330 includes a forwarder 338, a sequence marker 340, and a label encapsulator 342. The forwarder 338 is in communication with the source user network 118 to receive the packet stream and with the sequence marker 340. The forwarder 338 includes a table that maps incoming packets to the interfaces of the egress modules 142', 144'. The sequence marker 340 is in communication with the label encapsulator 342, and the label encapsulator 342 is in communication with the fabric 140'.

In one embodiment, the egress modules 142', 144' and ingress module 330 are implemented as individual line cards in the source endpoint device 102. In another embodiment, the egress modules 142', 144' are implemented on the same line card and the ingress module on a second line card. In a third embodiment, the egress modules 142', 144' and ingress module 330 are implemented on a single line card.

Operation of the source endpoint device 102' is similar to that of the source endpoint device 102 described in FIG. 3A and FIG. 3B with certain differences. One difference is that the ingress module 330 of the source endpoint device 102' of FIG. 5 performs operations relegated to the egress modules 142, 144 of the source endpoint device 102 of FIG. 2, namely adding sequence numbers and labels to the packets. In this embodiment, the ingress module 330 includes the sequence marker 340, which adds the sequence number to each packet in the packet stream, and the label encapsulator 342, which pushes labels (e.g., VC labels and transport labels) onto each packet. Thus, when the packet stream arrives at the fabric 140' and subsequently at the egress module 142', the packets already include sequence numbers and labels. From this packet stream with labeled and numbered packets, the packet processor 157' produces a plurality of packet streams. As described above, these packet streams can operate as redundant streams or achieve bandwidth sharing.

In the event of an equipment failure, (for example, a failure of the egress module 142'), an active signal that drives high when the egress module 142' is functioning properly is pulled low, thus notifying all ingress and egress modules simultaneously of the failure. The forwarder 338 modifies its table to redirect the incoming packet stream through the fabric 140' to the non-failing egress module 144'. The sequence marker 340 and label encapsulator 342 ensure that the packets that arrive at the functioning egress module 144' have sequence numbers and labels. The functioning egress module 144' then handles and provides a plurality of packet streams similarly to the egress module 144 described above in connection with FIG. 2 and FIG. 3B.

In another embodiment of the source endpoint device 102', shown in phantom in FIG. 5, the ingress module 330 also includes a packet processor 344 in communication between the label encapsulator 342 and the fabric 140'. In this embodiment, the packet processors 157', 159' of the egress modules 142', 144' are bypassed or removed. The sequence marker 340 of the ingress module 330 adds sequence numbers to each packet, the label encapsulator adds at least one label, and the packet processor 344 provides a plurality of packet streams to the fabric 140' based on these packets. One packet stream passes to the egress module 142' over line 168' and a second packet stream passes to the egress module 144' over line 170'. In another embodiment, the fabric 140' rather than the ingress module 330 has the packet processor 344, in which instance, the ingress module 330 forwards a single packet stream to the fabric 140' and the fabric 140' provides the plurality of packet streams from this single packet stream. In each of these embodiments, the packet stream passing to the egress module 142' can be identical to or different from the packet stream passing to the egress module 144' as described above.

Figure 6:
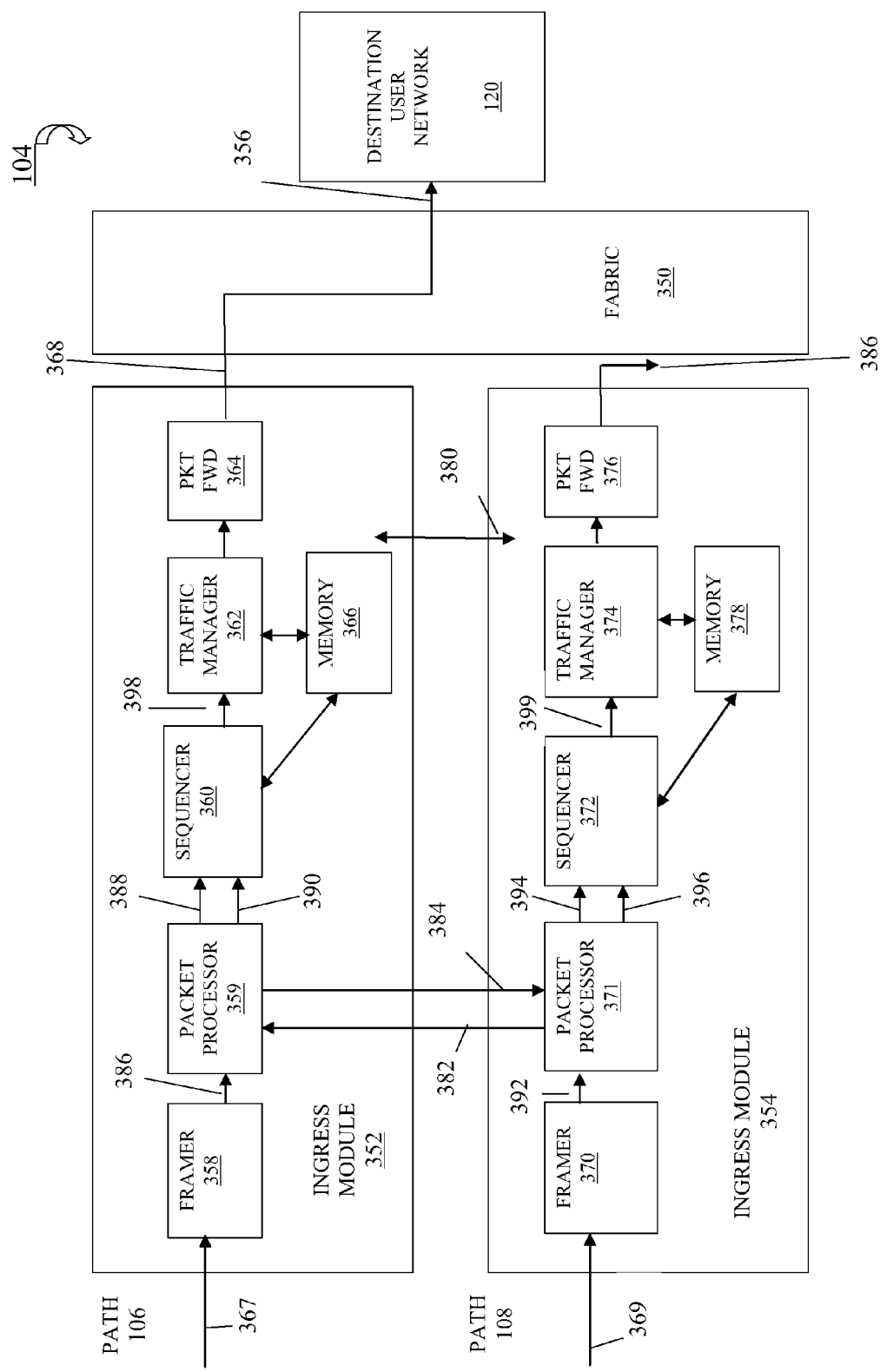
FIG. 6 is a block diagram illustrating an embodiment of the destination endpoint device of FIG. 1.

FIG. 6 shows an embodiment of the destination endpoint device 104 of FIG. 1 constructed in accordance with the principles of the invention. The destination endpoint device 104 includes a fabric 350 and a plurality of ingress modules 352, 354. The fabric 350 is in communication with the destination user network 120 over egress line 356 and provides a physical interconnection architecture that redirects packets from any incoming port to any outgoing port.

The ingress module 352 includes a framer 358, a packet processor 359, a sequencer 360, a traffic manager 362, a packet forwarder (PKT FWD) 364, and memory 366. The egress module 352 is in communication with the line 367, which encompasses path 106, and with the fabric 350 by the line 368. The ingress module 354 is in communication with the line 369 path 108. The ingress module 354 includes a framer 370, packet processor 371, a sequencer 372, a traffic manager 374, a packet forwarder (PKT FWD) 376, and memory 378. The ingress modules 352, 354 are in communication with each other by a protection switch control signal line 380 and by packet transfer lines 382, 384.

In one embodiment, each ingress module 352, 354 is implemented on its own line card in the destination endpoint device 104. Protection switch control line 380 and packet transfer lines 382, 384 appear as backplane traces in the destination endpoint device 104. Typically, for such an embodiment, the ingress module line cards 352, 354 reside adjacent to each other in the destination endpoint device 104 to reduce the length of the backplane traces. In another embodiment, a single line card in the destination endpoint device 104 includes both ingress modules 352, 354. Because the ingress modules 352, 354 are on a single line card, the backplane traces are unnecessary to implement the protection switch control signal line 380 and packet transfer lines 382, 384.

The framer 358 of the ingress module 352 is in communication with the line 367 to receive a first packet stream arriving at the destination endpoint device 104 on path 106. Line 386 connects the framer 358 to the packet processor 359 by which the first packet stream passes to the packet processor 359 minus overhead information removed from the first packet stream by the framer 358.

The framer 370 of the ingress module 354 is in communication with the line 369 to receive a second packet stream arriving at the destination endpoint device over path 108. Line 392 connects the framer 370 to the packet processor 371 to carry the second packet stream (minus overhead information removed by the framer 370) to the packet processor 371.

Packet transfer lines 382 and 384 connect the packet processor 359 of the ingress module 352 to the packet processor 371 of the ingress module 354. Packet transfer line 382 conveys a copy of the second packet stream received by the ingress module 354 to the ingress module 352, and packet transfer line 384 connects a copy of the first packet stream received by the ingress module 352 to the ingress module 354.

A plurality of packet processor output lines 388 and 390 connect the packet processor 359 of the ingress module 352 to the sequencer 360. The output line 388 carries the first packet stream received from the framer 358 and the output line 390 carries the second packet stream received from the ingress module 354. The sequencer 360 is in communication with the traffic manager 362 by a sequencer output line 398 by which the sequencer 360 provides a single packet stream derived from the plurality of packet streams received over the packet processor output lines 388 and 390.

Similarly for the ingress module 354, a plurality of packet processor output lines 394 and 396 connect the packet processor 371 to the sequencer 372. The output line 394 carries the first packet stream received from the ingress module 352 and the second output line 396 carries the second packet stream received from the framer 370. A sequencer output line 399 connects the sequencer 372 to the traffic manager 374 by which the traffic manager 374 receives a single packet stream from the sequencer 372.

Each traffic manager 362, 374 is in communication with the packet forwarder 364, 376, respectively, and with memory 366, 378, respectively. The memory 366, 378 provides queuing capabilities used by the respective traffic manager 362, 374, for example, in controlling traffic and congestion for the packet stream received from the sequencer 360, 372. Also, the memory 362, 374 stores expected sequence numbers and timestamp information, as described in more detail below.

The packet forwarder 364 of the ingress module 352 is in communication with the fabric 350 to forward the packet stream received from the traffic manager 362. During normal operation, the packet forwarder 376 of the ingress module 354 is not in communication with the fabric 350, as illustrated by the open connection 386.

Figure 7A:
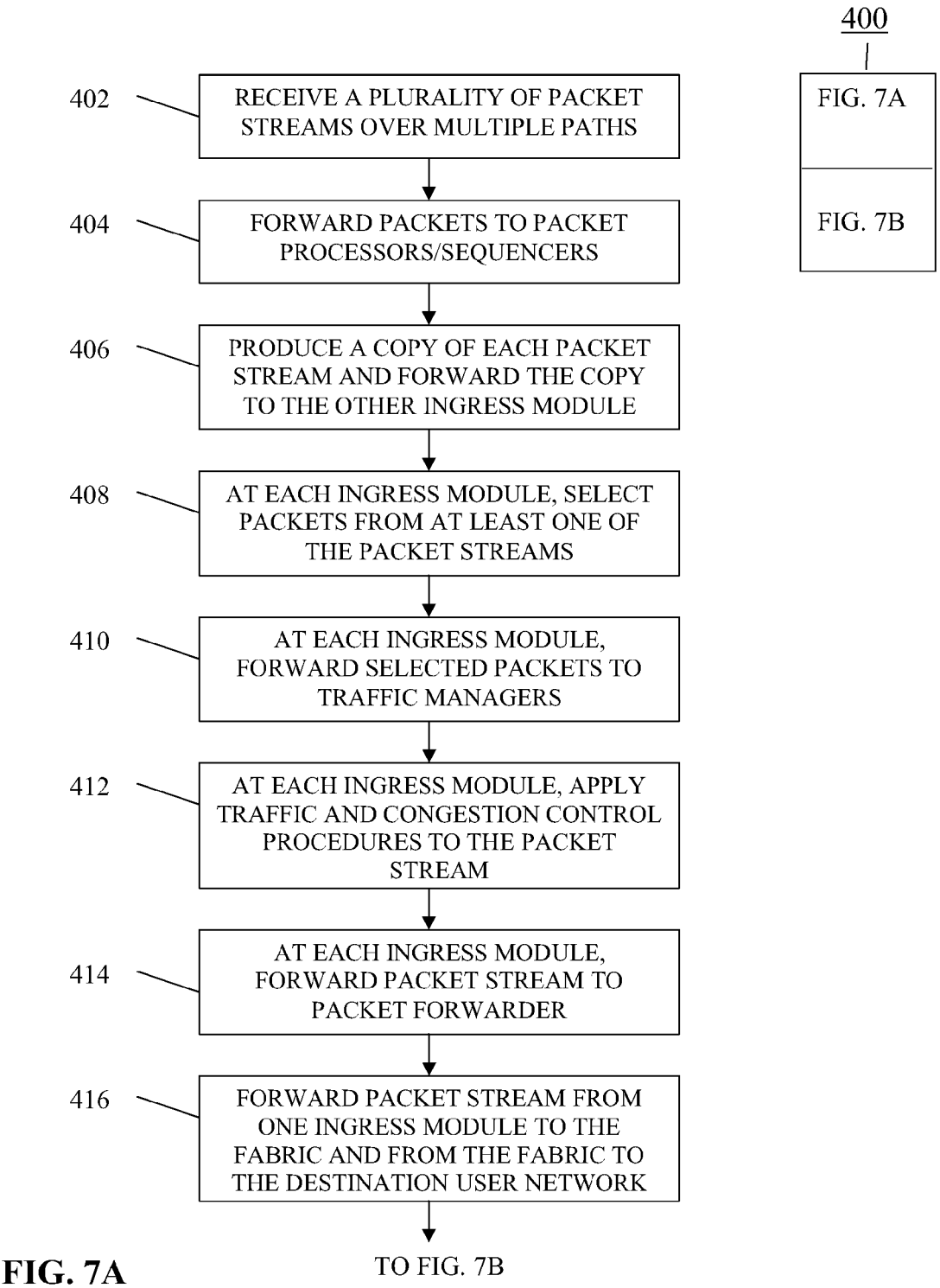
FIG. 7A and FIG. 7B are flow diagrams illustrating an embodiment of a process used by the destination endpoint device to produce a single packet stream from a plurality of packet streams.
Figure 7B:
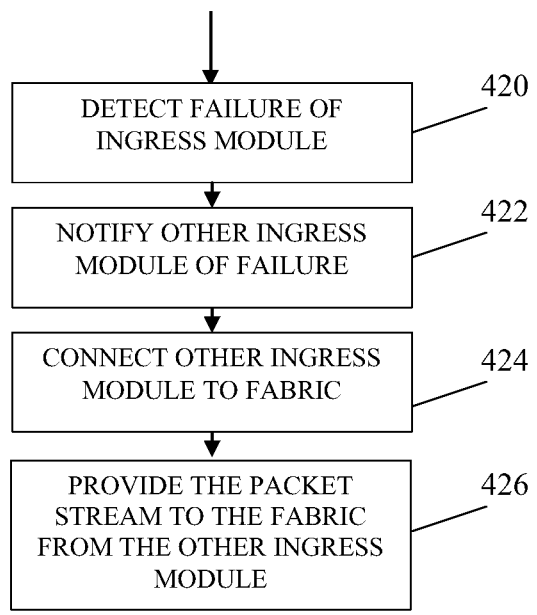

FIG. 7A and FIG. 7B shows an embodiment of a process 400 used by the destination endpoint device 104 of FIG. 6 to process a plurality of packet streams received over the communications network 100 over paths 106, 108. Referring now to FIG. 7A, a first packet stream arrives (step 402) at the ingress module 352 over path 106 and a second packet stream arrives at the ingress module over path 108. The packet streams are unsynchronized. For example, the first packet of the first packet stream can arrive at the destination endpoint device 104 before, simultaneously, or after the first packet of the second packet stream.

As each packet of a first packet stream arrives at the ingress module 352, the framer 358 receives, removes the overhead information, and forwards (step 404) the rest of the packet, including label(s), sequence number and datagram, to the packet processor 359. Similarly, the framer 370 of the ingress module 354 receives, extracts, and forwards (step 404) each packet of a second packet stream to the packet processor 371.

In step 406, the packet processor 359 of the ingress module 352 produces a copy of the first packet stream received on path 106 and forwards the copy to the other packet processor 371 over the packet transfer line 384. The packet processor 359 also forwards the first packet stream to the sequencer 360 over output line 388. Similarly, the packet processor 371 of the ingress module 354 produces a copy of the second packet stream received on path 108 and forwards the copy to the other packet processor 359 over the packet transfer line 382. The packet processor 371 also forwards the second packet stream to the sequencer 372 over output line 396.

In addition to receiving the first packet stream over output line 388, the sequencer 360 of the ingress module 352 receives the copy of the second packet stream from the packet processor 359 over the output line 390. The sequencer 372 of the ingress module 354, in addition to receiving the second packet stream over the output line 396, receives the copy of the first packet stream from the packet processor 371 over the output line 394. Accordingly, each of the sequencers 360, 372 receives the first and second packet streams (minus framing overhead information) arriving on the paths 106, 108.

Then the sequencer 360 of the ingress module 352 selects (step 408) packets from the packet streams arriving on lines 388 and 390, using the sequencer numbers in the packets and expected sequence numbers stored in the memory 366, as described in more detail below, and forwards (step 410) the selected packets to the traffic manager 362 over the output line 398. Similarly, the sequencer 372 of the ingress module 354 selects (step 408) packets from the packet streams arriving on lines 394 and 396 based on the sequencer numbers in the packets and expected sequence numbers stored in the memory 378, and forwards (step 410) the selected packets to the respective traffic manager 374 over the output line 399. Thus, from the plurality of packet streams, each of the sequencers 360, 372 produces a single packet stream.

In step 412, the traffic managers 362, 374 apply traffic control and congestion control procedures to the packet stream that the traffic manager receives from the respective sequencer 360, 372. Each of the traffic managers 362, 374 forwards (step 414) its packet stream to the respective packet forwarder 364, 376.

Although the traffic managers 362, 374 can apply the same sets of traffic control and congestion control procedures, the traffic managers 362, 374 are not clock synchronized, and thus may exhibit different behavior with respect to each other under certain conditions. For instance, the traffic managers 362, 374 can have different packet discard behaviors under congestion. Consequently, the packet stream forwarded to the packet forwarder 364 by the traffic manager 362 and the packet stream forwarded to the packet forwarder 376 by the traffic manager 374 may not be identical.

In one embodiment, under normal operating conditions, the packet forwarder 364 of the ingress module 352 forwards (step 416) the single output packet stream to the fabric 350, which forwards the packet stream to the destination user network 120, and the packet forwarder 376 of the ingress module 354 discards its output packet stream.

Referring now to FIG. 7B, if the ingress module that is currently providing a packet stream to the fabric 350 fails (here, ingress module 352), the fabric 350 detects (step 420) the failure. Also, a signal on the protection switch control line 380 notifies (step 422) the other ingress module 354, which is still operational, of the failure. In response to this signal, the other ingress module 354 becomes connected (step 424) to the fabric 350. The functioning ingress module 354 thereafter provides (step 426) the packet stream to the fabric 350, i.e., the packet stream that arrives over path 108, for forwarding to the destination user network 120. Upon a correction of the equipment failure, the ingress module 354 ceases to communicate with the fabric 350, and the fabric 350 returns to receiving the packet stream from the ingress module 352.

If, instead, the line or path that feeds the packet stream to the ingress module 352 fails (here, line 367 or path 106), the ingress module 352 detects the failure. In this case, the ingress module 352 continues to provide its packet stream to the fabric 350, using the packet stream that arrives from the other ingress module 354. In this way, the traffic shaping performed by the traffic manager 362 of the ingress module 352 remains in effect although there is a line or path failure.

Figure 8:
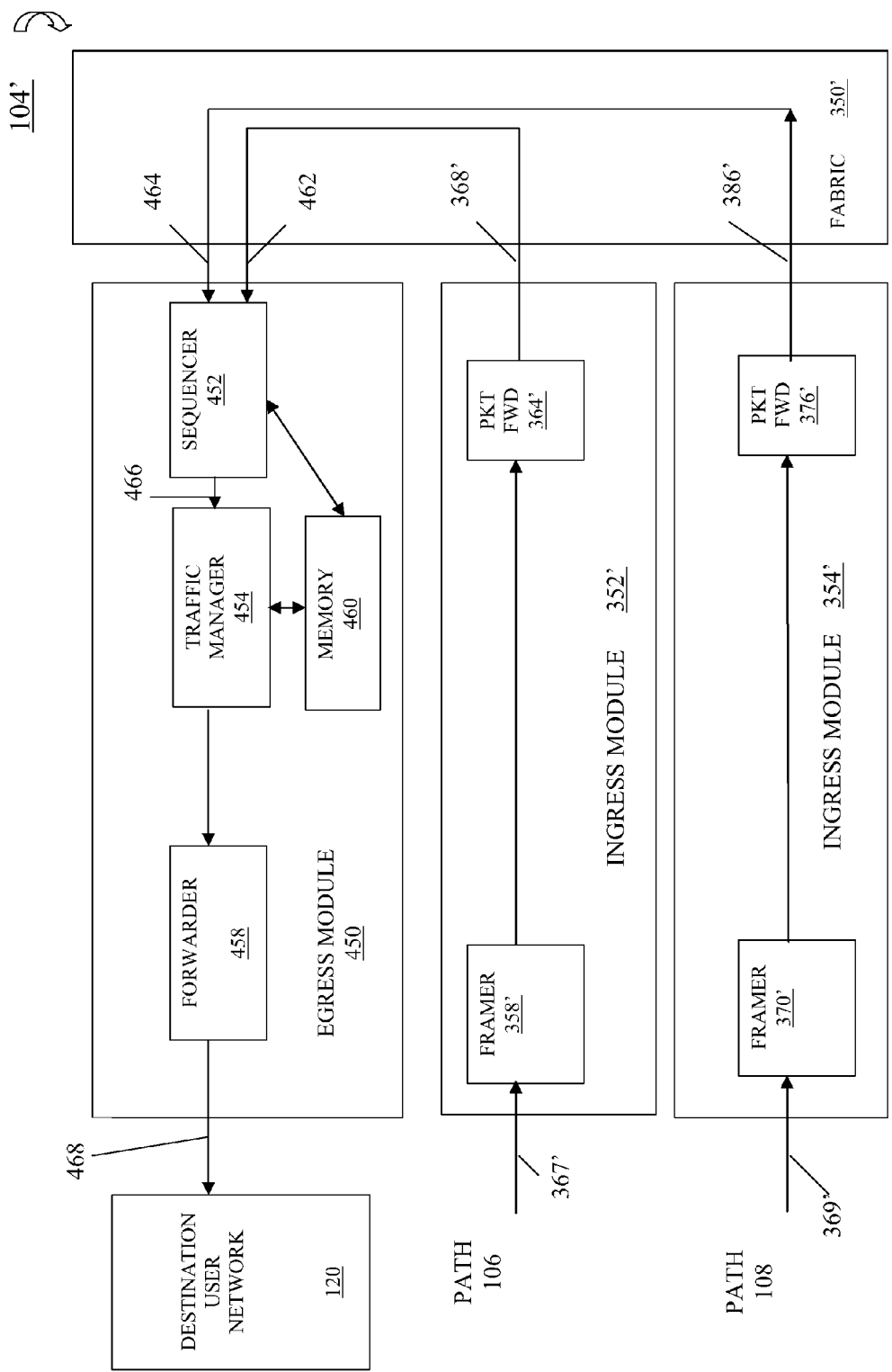
FIG. 8 is a block diagram illustrating other embodiments of the destination endpoint device of FIG. 1.

FIG. 8 shows an embodiment of a destination endpoint device 104' constructed in accordance with the principles of the invention. The destination endpoint device 104' includes a fabric 350' and a plurality of ingress modules 352', 354', and an egress module 450.

The ingress module 352' includes a framer 358' in communication with a packet forwarder 364'. The framer 358' is in communication with the line 367 (which includes path 106) and the packet forwarder (PKT FWD) 364' is in communication with the fabric 350' over line 368'.

The ingress module 354' includes a framer 370' in communication with a packet forwarder (PKT FWD) 376'. The framer 370' is in communication with the line 369' (which includes path 108) to receive a second packet stream, and the packet forwarder 376' is in communication with the fabric 350' over line 386'.

The egress module 450 includes a sequencer 452, a traffic manager 454, a forwarder 458, and memory 460. The sequencer 452 includes a plurality of input lines 462, 464 connect the sequencer 452 to the fabric 350'. The input line 462 carries the first packet stream received by the fabric 350' from the ingress module 352' over line 368'. Input line 464 carries the second packet stream received by the fabric 350' from the ingress module 354' over line 386'.

An output line 466 connects the sequencer 452 to the traffic manager 454. Memory 460 is in communication with the traffic manager 454 to provide queuing capabilities and with the sequencer 452 to store expected sequence numbers and timestamp information for use by the sequencer 452 to produce a single packet stream from the plurality of packet streams arriving by input lines 462 and 464. The forwarder 458 is in communication with the destination user network 120 over egress line 468.

In operation, the ingress modules 352' receives a first packet stream over path 106 and the ingress module 354' receives a second packet stream over path 108. The ingress modules 352' and 354' forward the respective packet streams to the fabric 350'. The fabric 350' forwards the packet streams to the sequencer 452 of the egress module 450 over input lines 462, 464s. If one of the ingress modules fails, the other ingress module continues to forward a packet stream to the fabric 350'. If the packet streams are redundant, the failure causes no loss of data. If the packet streams are "bandwidth sharing," the loss of one ingress module causes the loss of data traversing the path to the failed ingress module until the source endpoint device 102 becomes aware of the failure and ceases to direct the packet stream to that ingress module.

From the packet streams arriving on the input lines 462 and 464, the sequencer 452 provides a single output packet stream to the traffic manager 454. The traffic manager 454 performs traffic shaping procedures on the packet stream while forwarding the packet stream to the forwarder 458, which transmits the packet stream to the destination user network 120.

Figure 9:
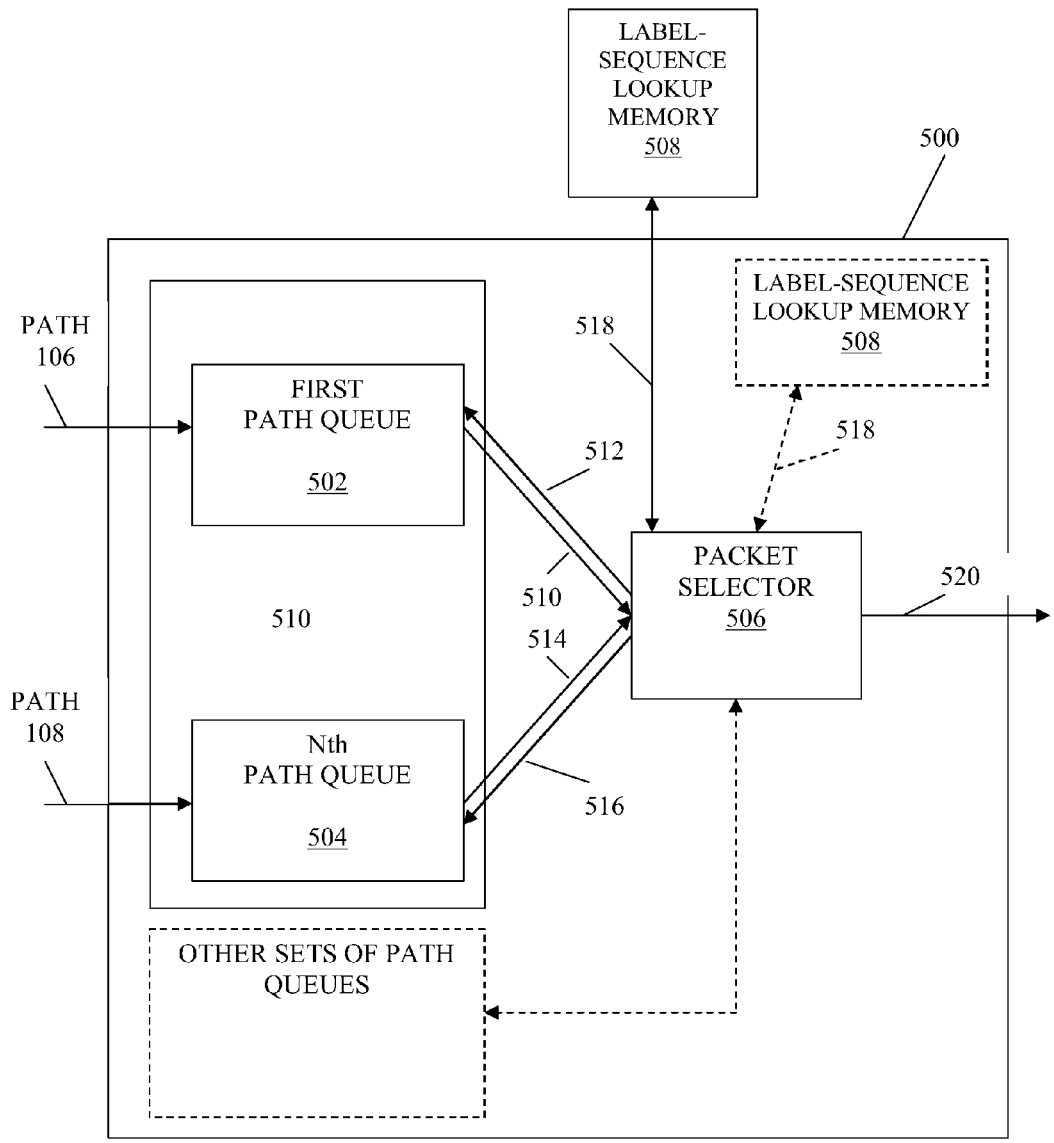
FIG. 9 is a block diagram of an embodiment of a sequencer for use in any one of the embodiments of destination endpoint devices shown in FIG. 6 and FIG. 8.

FIG. 9 shows an embodiment of a sequencer 500 including a set 510 of path queues 502, 504 and a packet selector 506. The packet selector 506 is in communication by line 518 with lookup memory 508 that is external to the sequencer 500. In another embodiment, shown in phantom, the lookup memory 508 is part of the sequencer 500. The lookup memory 508 stores a database of expected sequence numbers and timestamp information.

The sequencer 500 is a representative embodiment of the sequencers described above in connection with the various ingress and egress modules of the destination endpoint devices 104 and 104'. There is a set of path queues in the sequencer 500 for as many paths that terminate at the ingress or egress module in which the sequencer 500 resides. For example, if n paths terminate at the egress module 354 (FIG. 6), the sequencer 500 has n sets of path queues.

In one embodiment, the set 510 of path queues includes a first path queue 502 and an "Nth" path queue 504. (The designation "Nth" for the path queue 504 indicates that, in some embodiments, packet streams from more than two paths can arrive at the sequencer 500.) In this embodiment, the first path queue 504 is adapted to receive the packet stream that arrives at the sequencer 500 over the path 106, and the Nth path queue 504 is adapted to receive the packet stream that arrives at the sequencer 500 over the path 108. The first path queue 502 is in communication with the packet selector 506 by lines 510 and 512, and the Nth path queue 504 is in communication with the packet selector 506 by lines 514 and 516.

Because the packet streams traversing paths 106, 108 are unsynchronized (with respect to bit or byte synchronization), one packet stream can arrive at the sequencer 500 before packets of the other packet stream. For packets streams carrying substantially identical packets (i.e., identical except for those packets, if any, dropped by the traffic managers of the source endpoint device 102), the delay caused by a path length difference between the paths 106, 108 is not a factor because the sequencer 500 selects the first packet that arrives with the next expected sequence number. Thus, the sequencer 500 forwards those packets from the packet stream that arrives sooner. As a result, the destination user network 120 benefits from the throughput of the faster path.

For packets streams carrying packets having different sequence numbers (e.g., during bandwidth sharing), the delay caused by a path length difference between the paths 106, 108 can affect the proper selection by the sequencer 500 of packets for the output packet stream. Thus, the sequencer 500 employs path length compensation to account for the time differential for a packet to travel path 106 versus path 108 so as to ensure that the differential delay between the packet streams does not exceed the buffering capabilities of the path queues 502, 504.

To accomplish path length determination, the source endpoint device 102 inserts a special sequence number periodically into the packet streams, thus using the sequence numbers to encode a "time marker" in addition to the sequence number of the packet. In one embodiment, the source endpoint device 102 uses the two most significant bits of the sequence number as a rolling path length determination counter. The source endpoint device 102 inserts an incremented path measurement periodically (e.g., every two milliseconds, i.e., the count in the two most significant bits increases by one every two milliseconds).

The sequencer 500 at the destination endpoint device 104 determines from the most significant bits of the sequence number whether the differential delay exceeds a specified buffer capacity (e.g., 4 ms) for each path. For example, if one path queue has a packet with 11 (binary) in the most significant bits of the sequence number, and another path queue has a packet with 01 (binary), the binary difference (11−01=10) indicates that there is a differential delay in excess of the 4 ms buffer capacity of the path queues. For an embodiment that uses the two most significant bits, the source endpoint device 102 injects the time marker into packet stream at a rate such that a difference of two (binary 10) flags a differential delay in excess of the capacity of the path queues (e.g., inject a time marker at less than every 2 ms (such as 1.99 ms) for path queues with a 4 ms capacity). In response to detecting an excessive differential delay, the sequencer 500 can then generate an alarm in response.

Figure 10:
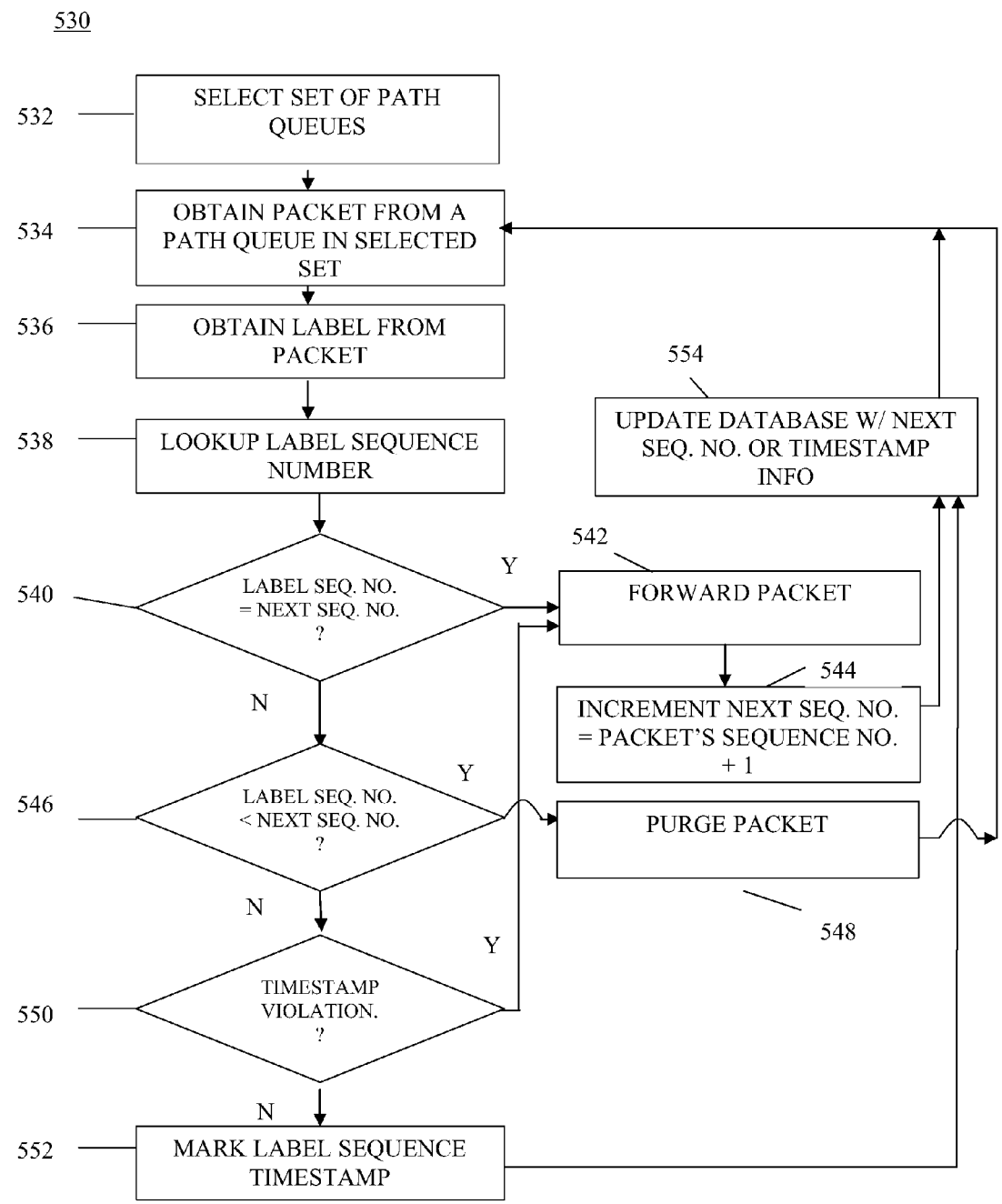
FIG. 10 is a flow diagram illustrating an embodiment of a process used by the sequencer of FIG. 9 to produce a single packet stream from plurality of packet streams.

FIG. 10 shows an embodiment of a process 530 used by the sequencer 500 to determine whether to select a packet from a particular path queue for forwarding to the output line 520. In one embodiment, the sequencer 500 performs two instantiations of this process 530 in parallel, one instantiation of the process 530 operates on the first path queue 502 and the other instantiation of the process 530 operates on the Nth path queue 504. Although, the instantiations of the process 530 operate independently of each other, each instantiation of the process 530 accesses a shared resource, i.e., the database stored in the lookup memory 508, to obtain and update expected sequence numbers and timestamp information that direct the behavior of the packet selector 506.

In brief overview, the sequencer 500 performs the instantiations of the process 530 in parallel to produce a single output packet stream from the multiple packet streams received over multiple paths, whether such paths convey redundant or different packet streams. The packet selector 506 performs a packet-by-packet selection of packets that have arrived at the path queues 502, 504, and forwards to the output line 520 the output packet stream in which the selected packets are in order based on their sequence numbers. In addition to the packets being in sequential order, the output packet stream has no duplicates packets.

More specifically, a first packet stream arrives at the first path queue 502 and a second packet stream arrives at the Nth path queue 504. The packet streams are not bit or byte synchronized with respect to each other.

In step 532, the packet selector 506 chooses a set of queues from which to obtain a packet. In one embodiment, the packet selector 506 uses weighted fair-queuing (WFQ) to choose between the sets of queues. The following description presumes that the packet selector 506 chooses, for example, the set 510 of path queues 502, 504. Also, although the steps of the process 530 are hereafter described with reference to the first path queue 502, it is to be understood that the sequencer 500 is performing such steps on the Nth path queue 504 in parallel (but not necessarily at the same time).

The packet selector 506 obtains (step 534) a packet at the head of the first path queue 502 in the selected set 510. Then the packet selector 506 obtains (step 536) a path label (i.e., a label that represents the path of the packet) from the packet and uses the path label to look up (step 538) a sequence number in the shared database stored in the lookup memory 508 over the line 518. This sequence number is the next expected sequence number for that path.

In step 540, the packet selector 506 compares the sequence number in the packet with the next expected sequence number obtained from the shared database. If the sequence number of the packet is equal to the next expected sequence number, the packet selector 506 obtains the packet over the line 510 and forwards (step 542) the packet to the output line 520. The packet selector 506 updates the next expected sequence number (step 544) to be equal to the sequence number in the packet plus one. The shared database in the lookup memory 508 stores the updated value, which is now available to each instantiation of the process 530.

If the sequence number of the packet is not equal to the next expected sequence number, the packet selector 506 determines (step 546) if the sequence number of the packet is less than the next expected sequence number. If the sequence number of the packet is less than the next expected sequence number, this indicates that the packet selector 506 has previously seen and forwarded a packet with the same or a higher sequence number than this current packet. The packet selector 506 then issues a purge signal to the path queue over the line 512 and the queue purges (step 548) the packet.

If the sequence number of the packet is neither less than nor equal to the next expected sequence number, the packet selector 506 determines (step 550) whether the packet has a timestamp violation. In order to avoid waiting for a packet that never arrives, the sequencer 500 assigns a timestamp to the sequence number for that VC-LSP. In one embodiment, the criterion for a timestamp violation is related to the capacity of the path queue such that any wait for the packet does not exceed the maximum path differential delay (e.g., the 4 ms described above). Thus, if the timestamp assigned to the sequence number indicates that the sequencer 500 has waited more than four milliseconds for the packet with the expected sequence number, a timestamp violation has occurred.

If there is a timestamp violation, this indicates that the packet with the expected sequence number may have been dropped by both paths 106, 108 or that the sequencer of the source endpoint device 102 has operated incorrectly. The sequencer 500 skips this sequence number. The packet selector 506 forwards (step 542) the packet to the output line 520. Also, the packet selector 506 updates (step 544) the next expected sequence number to be equal to the sequence number in this packet plus one and stores (step 554) the updated value in the database.

If there is no timestamp violation, the packet selector 506 marks (step 552) the time stamp of the packet and the packet remains in the queue to await the next time the packet selector 506 selects the queue and examines the packet. The packet selector 506 then updates (step 554) the timestamp in the database stored in the lookup memory 508.

The following example illustrates the operation of the sequencer 500 for paths carrying identical packet streams. Consider, for example, that packet number 1 traversing path 106 arrives at the first path queue 502 before the corresponding packet number 1 traversing path 108 arrives at the Nth path queue 504. Because the next expected sequence number is 1, the packet selector 506 selects packet number 1 from the first path queue 502, forwards the packet to the output packet stream on the output line 520, and updates the next expected sequence number to equal to 2. When the packet selector 506 finds packet number 1 in the Nth path queue 504, which is less than the expected sequence number of 2, the packet selector 506 sends a signal to the Nth path queue 504 over line 516 to purge packet number 1 from the Nth path queue 504.

Assume also that packet number 2 traversing path 106 arrives at the first path queue 502 after the corresponding packet number 2 traversing path 108 arrives at the Nth path queue 504. Because the packet selector 506 selects the first packet that arrives at the sequencer 500 with the expected sequence number (here number 2), the packet selector 506 forwards packet number 2 in the Nth path queue 504 to the output line 520 and sends a signal to the first path queue 502 over line 512 to purge packet number 2 from the first path queue 502. This example illustrates that the sequencer 500 can produce an output packet stream from packets of both input packet streams that arrive at the sequencer 500 over different paths 106, 108.

The procedure compensates for lost packets. If instead of being delayed the packet with the sequence number 2 on path 106 was lost, e.g., dropped because of congestion by the network 114, the corresponding packet number 2 on the other path 108 provides the missing packet.

Consider next that for some reason a packet with sequence number 3 does not arrive at the sequencer 500 on either path 106, 108, and that packet number 4 on path 106 arrives at the path queue 502 before the packet number 4 on path 108 arrives at the Nth path queue 504. Because the packet selector 506 is looking for a packet with sequence number 3, but finds packet number 4 in the first path queue 502, the packet selector 506 checks to see if the packet has a timestamp violation. If there is no timestamp violation, the packet selector 506 marks the timestamp for the packet to be used during subsequent examinations for a timestamp violation. If there is a timestamp violation, the packet selector 506 forwards the packet to the output line 520; packet number 3 is no longer expected to arrive at the sequencer 500. The packet selector 506 then updates the expected sequence number to be equal to 5.

The following example illustrates the operation of the sequencer for paths carrying different packet streams. Consider, for example, that the source endpoint device 102 sends packets numbered 1, 2, 3, 5, 6, and 8 by the path 106 and packets numbered 4 and 7 by the path 108. The order of arrival at the path queues 502, 504 does not necessarily coincide with the sequence numbers assigned to the packets. For example, packet number 4 can arrive at the Nth path queue 504 before packet number 3 arrives at the first path queue 502.

Assume that the next expected sequence number is 3 because the packet selector 506 has already forwarded packets numbered 1 and 2 from the first path queue 502 to the output line 520. Assume also that packet number 3 traversing path 106 has not arrived at the first path queue 502, packet number 4 traversing path 108 has arrived at the Nth path queue 504, and that the packet selector 506 is reading the Nth packet queue 504. Because the packet selector 506 is looking for a packet with sequence number 3, and finds packet number 4 in the Nth path queue 504, the packet selector 506 checks to see if the packet has a timestamp violation. If there is no timestamp violation, the packet selector 506 marks the timestamp for the packet to be used during subsequent examinations for a timestamp violation.

Consider that before there is a timestamp violation for packet number 4, packet number 3 on path 106 arrives at the first path queue 502. The packet selector 506 finds and forwards packet number 3 to the output line 520 and then updates the expected sequence number to be equal to 4. The next time the packet selector 506 accesses the Nth path queue 504, the packet selector 506 finds and forwards packet number 4 to the output line 520.

Provided no packets are dropped or lost during transmission to the sequencer 500, the packet selector 506 forwards to the output line 520, in order, packets numbered 1, 2, and 3 from the first path queue 502, packet numbered 4 from the Nth path queue 504, packets numbered 5 and 6 from the first path queue 502, packet numbered 7 from the Nth packet queue 504, and packet 8 from the first path queue 502, to produce an output packet stream with the packets in sequential order 1, 2, . . . 8.

While the invention has been shown and described with reference to specific preferred embodiments, it should be understood by those skilled in the art that various changes in form and detail may be made therein without departing from the spirit and scope of the invention as defined by the following claims.

What is claimed is:

1. A node for a packet communication network, the node comprising:
   a switch fabric; and
   first and second ingress modules, the first ingress module being configured:
   to receive a first stream of packets from a first physical path through the network;
   to forward a copy of the first stream of packets to an intermodule communication channel;
   to receive a copy of a second stream of packets from the second ingress module; and
   when selected to forward packets to the switch fabric, to select packets from the first stream of packets and the copy of the second stream of packets for forwarding as a single packet stream to the switch fabric based on sequence numbers in the packets;

the second ingress module being configured:
  to receive the second stream of packets from a second physical path through the network;
  to forward the copy of the second stream of packets to the intermodule communication channel;
  to receive the copy of the first stream of packets from the intermodule communication channel; and
  when selected to forward packets to the switch fabric, to select packets from the copy of the first stream of packets and the second stream of packets for forwarding as a single packet stream to the switch fabric based on sequence numbers in the packets;
the first and second ingress modules being configured such that, at any time, only one of the first and second ingress modules is selected to forward packets to the switch fabric.

2. The node of claim 1, wherein the selected one of the first and second ingress modules is selected based on a protection control signal.

3. The node of claim 1, wherein at least some of the packets in the first stream of packets have sequence numbers that are the same as at least some of the sequence numbers in the second stream of packets.

4. The node of claim 1, wherein the first ingress module is configured, on failure of the first physical path through the network when the first ingress module is selected, to select packets for forwarding to the switch fabric, and to select packets from the copy of the second stream of packets for forwarding to the switch fabric.

5. The node of claim 4, wherein the second ingress module is configured, on failure of the second physical path through the network when the second ingress module is selected, to select packets for forwarding to the switch fabric, and to select packets from the copy of the first stream of packets for forwarding to the switch fabric.

6. The node of claim 1, wherein:
  the first ingress module is configured, on failure of the second ingress module, to select packets from the first stream of packets for forwarding to the switch fabric; and
  the second ingress module is configured, on failure of the first ingress module, to select packets from the second stream of packets for forwarding to the switch fabric.

7. The node of claim 1, wherein the first and second ingress modules are configured, when selected to forward packets to the switch fabric, to select packets from the first and second stream of packets for forwarding to the switch fabric based on sequence numbers by comparing the sequence numbers to expected sequence numbers.

8. The node of claim 7, wherein the packets in the single packet stream are in an order based on the sequence numbers of those packets.

9. The node of claim 1, wherein:
  the node comprises a label switched router;
  the first packet stream comprises a packet stream of a label switched path; and
  the second packet stream comprises a packet stream of a label switched path.

10. The node of claim 9, wherein:
  the first packet stream comprises a packet stream of a first label switched path;
  the second packet stream comprises a packet stream of a second label switched path; and
  the single stream of packets forwarded by the selected ingress module to the switch fabric comprises a packet stream of a third label switched path.

11. A method of operating a node for a packet communication network, the method comprising:
  operating a first ingress module:
    to receive a first stream of packets from a first physical path through the network;
    to forward a copy of the first stream of packets to an intermodule communication channel;
    to receive a copy of a second stream of packets from a second ingress module; and
    when selected to forward packets to the switch fabric, to select packets from the first stream of packets and the copy of the second stream of packets for forwarding as a single packet stream to the switch fabric based on sequence numbers in the packets;
  operating the second ingress module:
    to receive the second stream of packets from a second physical path through the network;
    to forward the copy of the second stream of packets to the intermodule communication channel;
    to receive the copy of the first stream of packets from the intermodule communication channel; and
    when selected to forward packets to the switch fabric, to select packets from the copy of the first stream of packets and the second stream of packets for forwarding as a single packet stream to the switch fabric based on sequence numbers in the packets; and
  operating the first and second ingress modules such that, at any time, only one of the first and second ingress modules is selected to forward packets to the switch fabric.

12. The method of claim 11, wherein the selected one of the first and second ingress modules is selected based on a protection control signal.

13. The method of claim 11, wherein at least some of the packets in the first stream of packets have sequence numbers that are the same as at least some of the sequence numbers in the second stream of packets.

14. The method of claim 11, comprising operating the first ingress module, on failure of the first physical path through the network when the first ingress module is selected, to select packets for forwarding to the switch fabric, and to select packets from the copy of the second stream of packets for forwarding to the switch fabric.

15. The method of claim 14, comprising operating the second ingress module, on failure of the second physical path through the network when the second ingress module is selected, to select packets for forwarding to the switch fabric, and to select packets from the copy of the first stream of packets for forwarding to the switch fabric.

16. The method of claim 11, comprising:
  on failure of the second ingress module, operating the first ingress module to select packets from the first stream of packets for forwarding to the switch fabric; and
  on failure of the first ingress module, operating the second ingress module to select packets from the second stream of packets for forwarding to the switch fabric.

17. The method of claim 11, comprising operating each ingress module, when selected to forward packets to the switch fabric, to select packets from the first and second streams of packets for forwarding towards the switch fabric based on sequence numbers by comparing the sequence numbers to expected sequence numbers.

18. The method of claim 17, wherein the packets in the single packet stream are in an order based on the sequence numbers of those packets.

19. The method of claim 11, wherein:
the node comprises a label switched router;
the first packet stream comprises a packet stream of a label switched path; and
the second packet stream comprises a packet stream of a label switched path.

20. The method of claim 19, wherein:
the first packet stream comprises a packet stream of a first label switched path;
the second packet stream comprises a packet stream of a second label switched path; and
the single stream of packets forwarded by the selected ingress module to the switch fabric comprises a packet stream of a third label switched path.

\* \* \* \* \*